(12) United States Patent
Boyapalle et al.

(10) Patent No.: US 11,663,297 B2
(45) Date of Patent: May 30, 2023

(54) SYSTEM AND METHOD TO ASSESS ANOMALOUS BEHAVIOR ON AN INFORMATION HANDLING SYSTEM USING INDIRECT IDENTIFIERS

(71) Applicant: Dell Products, LP, Round Rock, TX (US)

(72) Inventors: Anantha K. Boyapalle, Cedar Park, TX (US); Michael S. Gatson, Austin, TX (US); Marc R. Hammons, Round Rock, TX (US); Danilo O. Tan, Austin, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 945 days.

(21) Appl. No.: 15/067,027

(22) Filed: Mar. 10, 2016

(65) Prior Publication Data
US 2017/0262758 A1 Sep. 14, 2017

(51) Int. Cl.
*G06N 20/00* (2019.01)
*G06F 21/00* (2013.01)
*G06F 21/55* (2013.01)

(52) U.S. Cl.
CPC ............ *G06F 21/00* (2013.01); *G06F 21/552* (2013.01); *G06F 21/554* (2013.01); *G06N 20/00* (2019.01)

(58) Field of Classification Search
CPC ........ G06Q 20/206; G05B 2219/36542; G05B 2219/24159; G06F 21/00; G06F 21/31;
(Continued)

(56) References Cited

U.S. PATENT DOCUMENTS 7,237,023 B2 6/2007 Menard et al.
8,200,586 B2 6/2012 Alam et al.
(Continued)

FOREIGN PATENT DOCUMENTS

WO    WO 2014/205148 A1 * 12/2014 ............... G06F 7/04

OTHER PUBLICATIONS

Leo Breiman, "Random Forests", 2001, Kluwer Academic Publishers, vol. 45, pp. 5-32 (Year: 2001).*
(Continued)

*Primary Examiner* — Viker A Lamardo
(74) *Attorney, Agent, or Firm* — Prol Intellectual Property Law, PLLC; H. Kenneth Prol

(57) ABSTRACT

A computerized method to store aggregate information handling system interaction telemetry data representing levels of operational activity reported for a user of an information handling system in a monitoring system data repository memory device and for receiving aggregate information handling system interaction telemetry data for a plurality of other users crowd-sourced from a population of information handling systems accessed by a plurality of other users. An interaction signature platform may apply a supervised learning model algorithm to the aggregate information handling system interaction telemetry data for the user in comparison to the aggregate information handling system interaction telemetry data for the plurality of other users to determine at least one indirect identifier of the interaction telemetry data. The interaction signature platform constructs a fingerprint profile of operational activity by the user including a usage signature baseline for the at least one indirect identifier unique enough for identification.

20 Claims, 10 Drawing Sheets

(58) Field of Classification Search
CPC .......... G06F 21/30; G06F 12/14; G06F 21/62; G06F 21/552; G06F 21/554; G06N 99/005; G06N 20/00; H04L 12/2461; H04L 29/06551; H04L 29/0685; H04L 63/102; Y04S 40/24; G10H 2240/101; G03G 15/5091

See application file for complete search history.

(56) References Cited

U.S. PATENT DOCUMENTS

| | | | |
|---|---|---|---|
| 8,352,589 B2 | 1/2013 | Ridel et al. | |
| 8,359,389 B1 | 1/2013 | Cohen et al. | |
| 8,713,704 B2 | 4/2014 | Davis et al. | |
| 9,100,311 B2 | 8/2015 | Ferris et al. | |
| 9,275,345 B1* | 3/2016 | Song et al. | G06F 21/00 |
| 2005/0114397 A1* | 5/2005 | Doshi et al. | G06F 7/00 707/104.1 |
| 2008/0091453 A1* | 4/2008 | Meehan et al. | G06Q 30/00 |
| 2013/0055348 A1* | 2/2013 | Strauss et al. | G06F 21/20 726/3 |
| 2017/0161478 A1* | 6/2017 | Stavrou et al. | G06F 21/316 |
| 2017/0177393 A1* | 6/2017 | Gao et al. | G06F 9/45558 |

OTHER PUBLICATIONS

Geneiatakis et al., "Utilizing CPU, Memory and other features signals to control processes and related data in computing devices with potential to identify user," European Commission, Joint Research Centre, Institute for the Protection and Security of the Citizen, Report EUR 27054 EN, 2015 (Year: 2015).*

Deutschmann I, Lindholm J. "Behavioral biometrics for DARPA's active authentication program". In 2013 International Conference of the BIOSIG Special Interest Group (BIOSIG) Sep. 5, 2013 (pp. 1-8). IEEE. (Year: 2013).*

* cited by examiner

SYSTEM AND METHOD TO ASSESS ANOMALOUS BEHAVIOR ON AN INFORMATION HANDLING SYSTEM USING INDIRECT IDENTIFIERS

CROSS REFERENCE TO RELATED APPLICATIONS

Related subject matter is contained in co-pending U.S. patent application Ser. No. 14/789,823 entitled "Computing Device Service Life Management," filed on Jul. 1, 2015, the disclosure of which is hereby incorporated by reference.

Related subject matter is contained in co-pending U.S. patent application Ser. No. 14/789,847 entitled "Information Handling System Configuration Parameter History Management," filed on Jul. 1, 2015, the disclosure of which is hereby incorporated by reference.

Related subject matter is contained in co-pending U.S. patent application Ser. No. 15/043,615 entitled "System and Method to Assess Information Handling System Health and Resource Utilization," filed on Feb. 14, 2016, the disclosure of which is hereby incorporated by reference.

Related subject matter is contained in co-pending U.S. patent application Ser. No. 15/058,144 entitled "System and Method to Identify Resources Used by Applications in an Information Handling System," filed on Mar. 1, 2016, the disclosure of which is hereby incorporated by reference.

FIELD OF THE DISCLOSURE

The present disclosure generally relates to information handling systems, and more particularly relates to assessment of user interaction with information handling systems for anomalous behavior.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
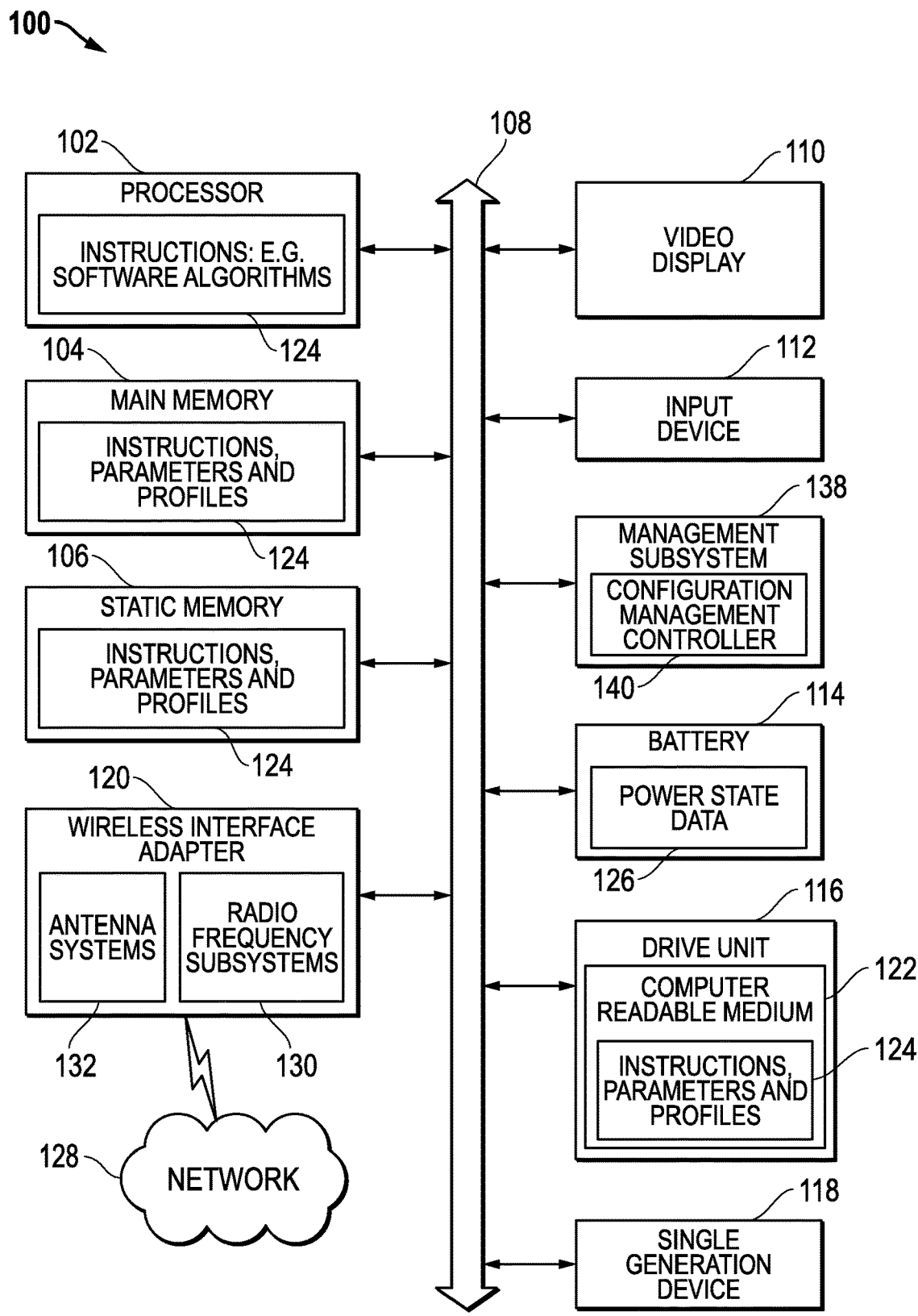
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

One or more users may interface with an information handling systems. A user's interaction and operational activity on an information handling system (IHS) may have several unique characteristics detectable in the measured performance of the information handling system. The present disclosure relates to an intelligent system configuration management system that may detect and measure information handling system interaction telemetry data and aggregate that data in monitoring system data repository. The aggregated information handling system interaction telemetry data may be sourced from one user interacting with an information handling system subject to interaction signature user identity algorithms in one aspect. In other aspects the aggregated information handling system interaction telemetry data may be sourced from a plurality of users interacting with a plurality of information handling systems reported to the monitoring system data repository.

The aggregated information handling system interaction telemetry data of operational activity for a user, when contrasted with a sample of operational activity drawn from other users of information handling systems, may yield a learned subset of core indirect identifiers for the user's interaction with the information handling system subject to interaction signature user identity. Operational activity drawn from data of measured operational parameters of other users reported as the aggregated information handling system interaction telemetry data may be drawn from a random set of other users operating on a plurality of different information handling systems. This other user operational activity may be compared to history of the user interacting with the information handling system subject to interaction signature user identity. The comparison will yield one or more identified indirect identifiers that are substantially distinct from performance characteristics of other users. Thus, the one or more identified indirect identifiers are unique enough to indicate interaction by the user interfacing with the information handling system. In an example embodiment, display brightness levels as a percentage of operating time by a user, average processor thread count, CPU processing time for applications, CPU idle time, laptop lid transitions, keyboard usage trends, touchpad usage, and other performance parameters have been found to be useful examples of indirect identifiers unique to users. Additional performance parameters are discussed further herein. Since the performance parameters that serve as useful indirect identifiers from user to user, a learned set of indirect identifiers specific for a user improves accuracy interaction signature platform identification. In some aspects, a set may be one indirect identifier that is useful to indicate a user interacting with an information handling system.

Information handling system interaction telemetry data a user may be aggregated over time during a learning phase for the information handling system interaction signature platform. During the learning phase, a user operating on the information handling system operating the interaction signature platform is identified. For example, this may be via user identification credentials during login or via a GUI presented to the user. Other methods of user verification may be used as is understood.

Once a fingerprint profile of operational activity for a user of the information handling system is established, later function of the information handling system may be monitored by the information handling system interaction signature platform. If a user logs onto an information handling system, but interaction operational activity does not match the fingerprint profile of operational activity for one or more indirect identifiers, an indication of the mismatch may be noted. It is understood that this may trigger several remediation operations including notification of the correct user or an IT administrator, a search among known users of an information handling system for a known fingerprint profile of operational activity, or implementation of security measures.

In the present disclosure, a monitoring system data repository is also established to gather monitored performance data across a population of information handling systems. The performance data may relate to a variety of software and hardware performance information detected and recorded at the contributing information handling systems. In one example embodiment, an enterprise or government organization may deploy a large population of systems employing a variety of software and hardware capabilities, but some of which may utilize similar hardware and software resources as well. In another embodiment, a computer manufacturer or leasing entity or an IT services organization may access various types of performance data from systems sold, leased, or under the care or responsibility of the organization. Performance monitoring may use techniques in some embodiments to keep all monitored performance data that is reported to a monitoring system data repository anonymous as to source of the data or shield content of information processed at a contributing information handling system. In other aspects, participation in providing information handling system performance data to a monitoring system data repository may be an opt in selection for users. In the present disclosure, performance monitoring may be associated with a particular set of user identification credentials in some aspects.

An intelligent configuration management system operating an information handling system interaction signature platform may access the monitoring system data repository reported by an information handling system performance monitoring system that monitors and stores data relating to usage of component devices and systems in contributing and client information handling systems. The information handling system performance monitoring system may operate in the background during operation of the contributing information handling system and serve to report back performance, utilization, and configuration information to the monitoring system data repository. Configuration information may include mapping and associations of software applications and firmware applications with drivers, files, libraries (DLLs), registry entries, processes, threads, services, network ports, or hardware for contributing and monitored information handling systems. Additional software telemetry data may be measured including component device resource utilization by software applications.

Detection of hardware inventory and software/firmware inventory for contributing information handling systems is one aspect of monitored performance data that may be crowd-sourced to the monitoring system data repository. Additionally, information on a footprint of resource utilization and linkages among software applications and hardware of contributing information handling systems may also be received. For example, configuration data is also reported including, for example, hardware configuration and changes over time, software changes, operating system (OS) changes, basic input output system (BIOS) changes, historic data on repair, etc. These aspects in addition to performance measurement data across a plurality of information handling systems may be used, as in the present disclosure, to show hardware and software expected for use with establishing baseline performance levels. In an example embodiment, numerous dynamic software behavior trends may be detected for client information handling systems by comparison to the crowd-sourced baseline performance levels adjusted based on mapping and associations of software applications or other configuration factors.

Profile and setting information is generally static, e.g., once default values of user settings are changed, typically based largely on user choice or static workload, the modified settings may continue to be used without much, if any, further change. However, profile and setting changes to an underperforming or abnormally performing client information handling system may, in some cases, result in improved performance. Assessment of software and hardware behavioral performance relative to crowd-sourced baseline performance levels provides for an opportunity in some cases to take full advantage of the capabilities and capacities of a client information handling system, including improvements in performance, power consumption, resource utilization, storage, graphics, etc.

Component device utilization data may be collected via numerous source information handling systems, and relate to operation of numerous hardware functions of each contributing information handling system. Component device utilization data may be retrieved from a variety of sensors including detection of events and usage that may contribute to performance characteristics of the client information handling system and a user's perception of such performance characteristics. Power draw measurements may be conducted on power rails supplying power to individual component devices in the client information handling system or to component devices externally connected to the information handling systems. Power draw measurements can be used to estimate power dissipation and thermal conditions at the individual component devices. Additionally processor activity, controller activity, wireless interface activity, memory/drive activity, and other component activity measurements may also be assessed independently or in connection with power draw measurements. Data representative of events detected by sensors, such as an impact detected by an accelerometer, can be collected. Data representative of events can be detected by system-level sensors, located, for example, on a motherboard of an information handling system, and by component-level sensors, located, for example, at a component, such as a hard disk drive (HDD), of the information handling system. Collected data may be sourced via SMBIOS, Win 32 API, or device drivers to a database repository. An example, hardware implementation monitoring database includes the Dell® Data Vault (DDV) system operational via Windows® or other operating systems. Component device utilization data may be collected and stored on-box locally at a client information handling system, or may be reported remotely to a hub server or servers or a remote data center hosting a DDV or other monitoring system data repository for a plurality of information handling systems.

Monitoring is done via network connection and an information handling system performance monitoring system and an intelligent configuration management system having an information handling system interaction signature platform. The monitored data may be associated with users and reported back to a monitoring system data repository. Baselines of performance parameters may be taken for users of information handling systems within a group of contributing information handling systems. For example, baselines of performance may be established over an enterprise for a plurality of users of information handling system operated by the enterprise. Feedback of performance when users in the enterprise are logged onto various devices enables determination of baseline operation for those users that are specific to the information handling systems being used. It is understood that crowd-sourced performance parameters for users amount to aggregate information handling system interaction telemetry data for operational activity of identified users. The data may further be crowd-sourced from a variety of users on information handling systems and may not necessarily be limited to within an enterprise. A selection of user aggregate information handling system interaction telemetry data creates baselines for interaction activity for performance parameters across a population. These baselines, in the form of a value or a distribution, are then used to create a comparison to an individual user operating on an information handling system running a user interaction signature platform according to the disclosure.

In some aspects, aggregate information handling system interaction telemetry data may include performance parameters across several systems. In such a case, the information handling system monitoring systems may establish mapping and associations of the software or firmware applications with drivers, files, libraries, registry entries, processes, threads, services, network ports, or hardware. Additional aspects may include determinations of hardware and software capabilities and configurations of information handling systems that may provide further bases for establishing comparison baselines from aggregate information handling system interaction telemetry data from other users and other information handling systems contributing crowd-sourced performance data.

System data collected and stored during operation of a contributing information handling systems can be used as a source of data reported on the information handling systems and to the monitoring system data repository. Thus, for example, for a customer's usage and device history may be reported to and stored in a monitoring system data repository (e.g., Dell® Data Vault). Detailed device and overall system usage conditions, event occurrences, and their severity can include, for example, data pertaining to power and duty cycle, system and individual device resource utilization profiles, thermal stress history, system off/storage conditions, mechanical stress counters, etc. may be reported for performance baseline determination by a an intelligent configuration management system operating an information handling system interaction signature platform.

A central information handling system management data repository, which may be referred to as a data vault or a monitoring system data repository, established by an information handling system vendor to store information handling system management data obtained from information handling systems in operation for customers, and can be used for obtaining data from which monitored client system configuration parameter values for a replacement information handling system can be determined. The monitoring system data repository can receive and store data obtained from local instrumentation of a both a plurality of contributing information handling systems and a monitored client information handling system. In a further aspect, the performance data collected may be associated with users via user identification information. The central monitoring system data repository can be used to implement monitoring and reporting the physical state of information handling systems and their interaction with users.

Contributing and client information handling systems can be monitored, for example, from the factory even after the systems have been sold and are being used by customers. In some embodiments, system data and performance may be crowd-sourced to a monitoring system data repository. Measured performance data is one aspect of data reported to the monitoring system data repository for access by an intelligent configuration management system. Measured performance data parameters include measurements taken of information handling system performance metrics including boot times, resume times, power draw during idle times, application start up times, application instruction execution times, application shut-down times, thermal generation, and various hardware and software utilization levels. Examples of performance data to be tracked can include the following: detailed device and overall system usage conditions and severity, system and individual device utilization profiles and parameters for hardware components, power parameter values, battery parameter values, system event parameter values, mechanical event parameter values, thermal parameter values, networking parameter values, processor parameter values, memory parameter values, display parameter values, storage parameter values, connector parameter values, and system configuration parameter values. Power parameters can include, for example, power-on hours (including alternating current (AC) power-on hours, battery power-on hours, and the sum of those hours), power cycles, hibernate and sleep state requests, time in sleep states, and duty cycles. Battery parameters can include, for example, relative state of charge (RSOC), charging current, voltage, power, battery cycles, temperature, current draw, and full charge capacity. System event parameters can include, for example, system thermal events, hardware and operating system (OS) system failure events, motherboard (MB) free fall events, and system-off conditions, such as storage conditions. Mechanical event parameters can include, for example, mechanical cumulative stress counters (accelerometers, free fall, hinge cycles, connector cycles, docking cycles, etc.). Thermal parameters can include, for example, central processing unit (CPU), motherboard, graphics, and memory temperatures, fan revolutions per minute (RPM) parameters, and thermal stress history. Networking parameters can include, for example, percentages of activity for wired and wireless network adapters. CPU and memory parameters can include, for example, memory usage, CPU usage and throttling, and paging activity. Display parameters can include, for example, brightness values and a number of displays. Storage parameters can include, for example, hard disk drive (HDD) parameters such as percentages of time in idle, read, and write states, Self-Monitoring, Analysis, and Reporting Technology (SMART) logs, and HDD free space. HDD parameters can include parameters pertaining to a rotating magnetic or optical disk or to a solid-state memory storage device, such as a flash memory drive. Connector parameters can include, for example, connection status of internal connectors. System configuration parameters can include, for example, a service tag, system type, basic input output system (BIOS) version, hard disk drive (HDD) size and model, battery size, operating system (OS), random access memory (RAM) size, etc. System configuration parameters can include, for example, hardware configuration and changes over time, software/operating system (OS) configuration and changes over time, and historic data on repair and service actions.

In an additional aspect, performance parameters may include operation levels of peripheral devices or I/O input devices including keyboard operation, mouse operation, touchpad usage, touch screen usage, or other similar peripheral or I/O devices.

In one aspect, data such as the above in a monitoring system data repository may be used by the intelligent configuration management system and information handling system interaction signature platform to establish baseline performance levels of usage by a user for a single information handling system resource or for a plurality of resources using one or more types of software applications on an information handling system.

The intelligent configuration management system is software code executable on one or more application processors. The application processors may reside on a client information handling system being monitored by the intelligent configuration management system or may reside at one or more remote servers and database systems. The intelligent configuration management system may operate an information handling system interaction signature platform. The information handling system interaction signature platform may conduct determination of resource utilization during interaction by a user with an information handling system and establishing baseline levels of interaction during operation. Comparison with crowd-sourced data for similar resource utilization due to interaction of other users may be a basis of a known operational threshold average levels. These comparisons are used to create models for the information handling system interaction signature platform that may indicate the likelihood of indirect identifiers for performance parameters in the operation of a client information handling system being linked with the identity of a user. The indirect identifiers may be useful to indicate when a user is or is not operating the information handling system. The information handling system interaction signature platform is part of the intelligent configuration management system software executable code or may be its own software operational on one or more information handling systems, including the client information handling systems being assessed.

The information handling system interaction signature platform may be used for notification purposes or to determine potential security breach or misuse of a client information handling systems. Actions can include, for example, notification of client information handling system of indirect identifiers indicating a person or entity other than the person logged into the system is operating. Other actions may include notification of a user or an IT manager of usage not matching the user credentials. Yet other actions may include setting system configuration such that access to the client information handing system is curbed or prohibited by the information handling system interaction signature platform. Additional security measures may be implemented.

Examples are set forth below with respect to particular aspects of an information handling system interaction signature platform as part of an intelligent configuration management system.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems of FIG. 2 such as 220, 221, 222, and 224 or servers or systems such as 210 located anywhere within network 200, including the remote data center 290 operating virtual machine applications as described herein. The information handling system 100 may also execute code 124 for a hardware implementation monitoring and reporting system, for an intelligent configuration management system including an information handling system interaction signature platform that may operate on servers or systems 210, remote data centers 290, or on-box in individual client information handling systems such as 220, 221, 222, and 224 according to various embodiments herein. In other aspects, intelligent configuration management system agents may operate on client information handling systems such as 220, 221, 222, and 224 to log and collect data relating to component device utilization and other use metrics. For example, utilization percentage of various component devices within the client information handling systems 220, 221, 222, and 224 may be measured and logged in an information handling system performance monitoring system data repository such as a Dell® Data Vault by the intelligent configuration management agent operating on the client information handling system. In some aspects, this component device utilization data may be reported back to a hub server or remote data center operating the intelligent configuration management system in accordance with the disclosure herein. In other aspects, some or all of the intelligent configuration management system may operate on-box at the client information handling system to provide configuration indications and other operations. One or more client information handling systems 220, 221, 222, and 224 may contribute mapping and association data for software applications as well as measured performance metrics during interaction by a user as disclosed herein. When such contributions of mapping and association data and measured performance metrics are crowd-sourced to an intelligent configuration management system, those information handling systems may be referred to as contributing information handling systems. Other client information handling systems, which may be any of 220, 221, 222, and 224 may be implement an information handling system interaction signature platform for recognition of users as described in embodiments described herein.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or other display technology. Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the intelligent configuration management system with information handling system interaction signature platform as disclosed herein. Additionally, instructions 124 may execute the information handling system performance monitoring system disclosed herein and an API may enable interaction between these application programs and device drivers and other aspects of the information handling system and software instructions 124 thereon. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The disk drive unit 116, and static memory 106, also contains space for data storage such as an information handling system performance monitoring system data. Gathered mapping and association data and performance metrics such as component device utilization data may also be stored in part or in full in data storage 106 or 116 which may serve as some or all of a monitoring system data repository. Further, the instructions 124 may embody one or more of the methods or logic as described herein. For example, instructions relating to the hardware implementation monitoring system, the intelligent configuration management system software algorithms, information handling system interaction signature platform algorithms, or the intelligent configuration management agent may be stored here.

In a particular embodiment, the instructions, parameters, and profiles 124 may reside completely, or at least partially, within the main memory 104, the static memory 106, disk drive 116 and/or within the processor 102 during execution by the information handling system 100. Software applications may be stored in static memory 106 or disk drive 116. Fingerprint profiles of operational activity by a user including usage signature baselines and determined indirect identifiers for users may be logged and stored in memory such as 106 and 116 as well as measured performance metrics including system performance measurements, component device performance measurements, and software application performance measurements conducted for the interaction signature platform system for comparison. Additionally, configuration policy settings, and configuration parameter value estimation profiles and other aspects relating to the intelligent configuration management system functions may be stored in disk drive 116 or static memory 106. Configuration parameter value estimation profiles may be statistical models of system performance, individual component device performance, performance enhancement value estimations, and configuration index determinations performed by an intelligent configuration management system in some embodiments. Parameters may include aspects of component data utilization data to be analyzed with the intelligent configuration management system. Determined baseline levels of performance metrics and information handling system interaction telemetry data and thresholds of deviation from those baseline performance levels may also be stored in disk drive 116 or static memory 106. Component device utilization data in storage may also include data such as component device utilization data measured by the processor 102 for specific component devices or systems during information handling system operation.

The information handling system may include a power source such as battery 114 or an A/C power source. Battery 114 may include a smart battery system that tracks and provides power state data 126. This power state data 126 may be stored with the instructions, parameters, and profiles 124 such as component device utilization data to be used with the systems and methods disclosed herein.

The information handling system may also have a management subsystem 138 with a plurality of information handling system subsystems for control of a plurality of systems. For example, data relative to the configuration of the information handling system may be collected or managed by a configuration management controller 140 such as configuration management unit that may access other elements shown in FIG. 1, for example, via one or more buses 108. In some aspects, system-level events, component-level events, system-level usage data, and component-level usage data can be collected and managed via the configuration management controller 140. In other aspects, event and usage data may also be monitored with respect to component devices of the information handling system. In some aspects where applicable, execution of configuration policy may be administered partially via the configuration management controller 140.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
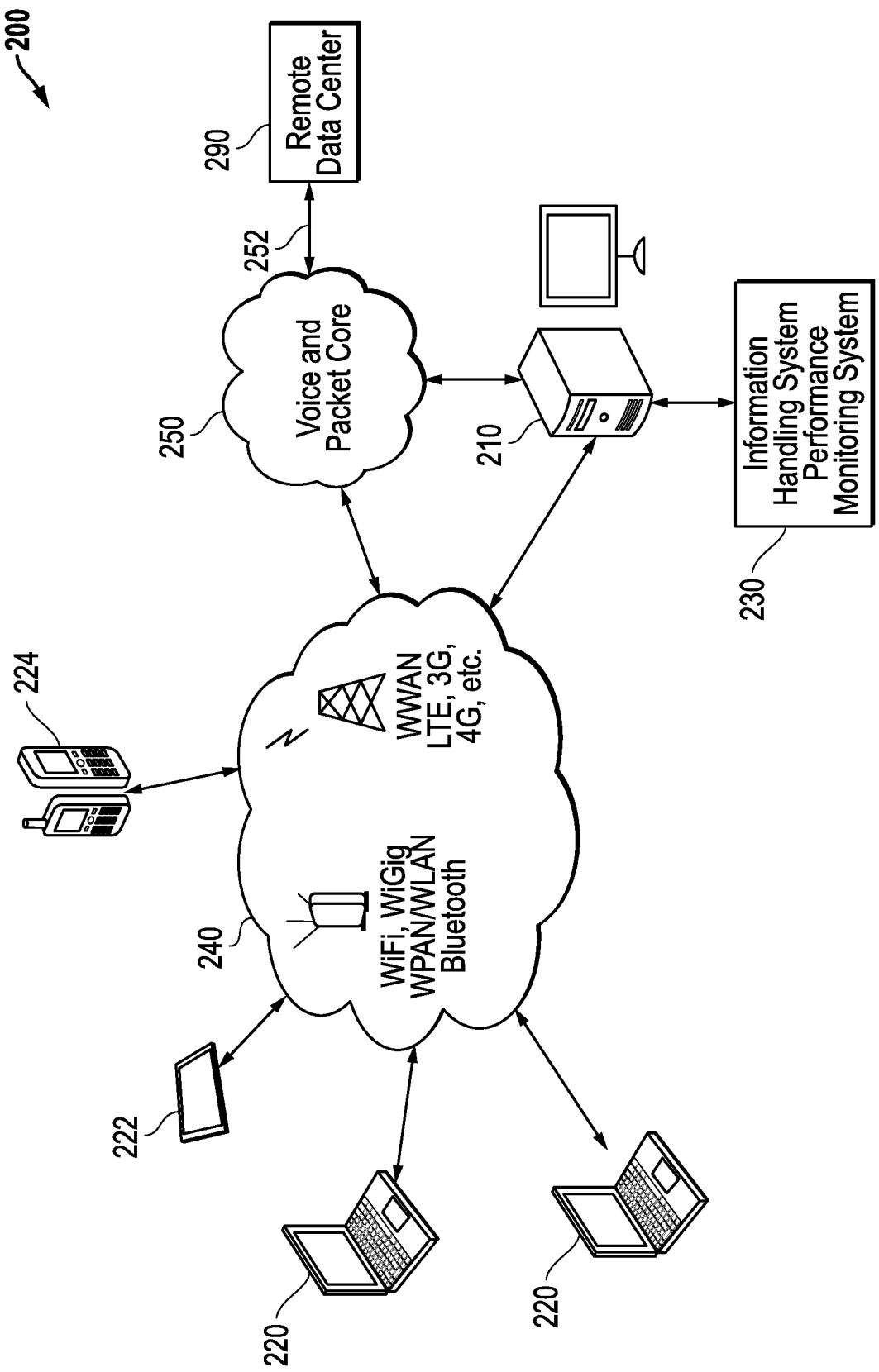
FIG. 2 is a block diagram illustrating a network environment having a plurality of information handling systems according to an embodiment of the present disclosure.

FIG. 2 illustrates a network 200 that can include one or more information handling systems. In a particular embodiment, network 200 includes networked information handling systems 210, 220, 221, 222, and 224, wireless network access points, routers and switches, and multiple wireless connection link options. Systems 210, 220, 221, 222, and 224 represent a variety of computing resources of network 200 including client mobile information handling systems, data processing servers, network storage devices, local and wide area networks, or other resources as needed or desired. In some embodiments, some or all of network 200 may be under control of IT management for a group or enterprise. As specifically depicted, systems 220, 221, 222, and 224 may be a laptop computer, tablet computer, or smartphone device in certain aspects. These user mobile information handling systems 220, 221, 222, and 224, may access a wireless local area network 240, or they may access a macro-cellular network. For example, the wireless local area network 240 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN or similar wireless network protocols. Alternatively, other available wireless links within network 200 may include macro-cellular connections. Macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 250 may contain externally accessible computing resources and connect to a remote data center 290. The voice and packet core network 250 may contain multiple intermediate web servers or other locations with accessible data (not shown). Connection between the wireless network 240 and remote data center 290 may be via Ethernet or another similar connection to the world-wide-web, a WAN, a LAN, another WLAN, or other network structure. Such a connection via WLAN access point/Ethernet switch to the external network may be a backhaul connection. The wireless access point may be connected to one or more wireless access points in the WLAN before connecting directly to a mobile information handling system or may connect directly to one or more information handling systems 210, 220, 221, 222, and 224.

Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 221, 222, and 224 allowing streamlining and efficiency within those devices. Similarly, remote data center 290 permits fewer resources to be maintained in other parts of network 200.

In an example embodiment, the cloud or remote data center 290 may run hosted applications for systems 210, 220, 221, 222, and 224. This may occur by establishing a virtual machine application executing software to manage applications hosted at the remote data center 290. Mobile information handling systems 220, 221, 222, and 224 are adapted to run one or more applications locally, and to have hosted applications run in association with the local applications at remote data center 290 or applications running on another remote information handling systems such as 210. The virtual machine application may serve one or more applications to each of the network connected information handling systems including 210 and client information handling systems 220, 221, 222, and 224. Thus, as illustrated, systems 220, 221, 222, and 224 may be running applications locally while requesting data objects or submitting data objects related to those applications from or to the remote data center 290 and host information handling system 210 via the wireless network. Similarly, system 210 may be running applications locally while requesting data objects or submitting data objects related to those applications from or to the remote data center 290 and receiving or submitting data objects to client information handling systems 220, 221, 222, and 224 via wireless network 240 or voice and packet core 250. For example, a Dell® Data Vault hardware implementation monitoring and reporting application may run locally at systems 220, 221, 222, and 224 and report data back to a host server system 210. In an embodiment, data may then be stored locally, at host system 210, or at a remote data center 290 relating to system status for client information handling systems 220, 221, 222, and 224. In other words, a central information handling system management data repository, which may be referred to as a data vault or a monitoring system data repository, may be local to host system 210, at remote data center 290, or some combination of the two. Server or host system 210 may also operate an intelligent system configuration management system software, including an information handling system performance monitoring system 230, in whole or in part in connection with multiple client systems such as 220, 221, 222, and 224. Server or host system 210 may operate to crowd-source mapping and association data, configuration data, and performance metrics. The intelligent system configuration management system software may also include an information handling system interaction signature platform for purposes of establishing baselines of operation and thresholds of deviation from baseline operation levels. Information handling system interaction signature platform may also operate to determine deviations in interaction or operation of one or more client information handling systems 220, 221, 222, and 224 relative to baseline operation of a fingerprint profile of operational activity for a user.

Figure 3:
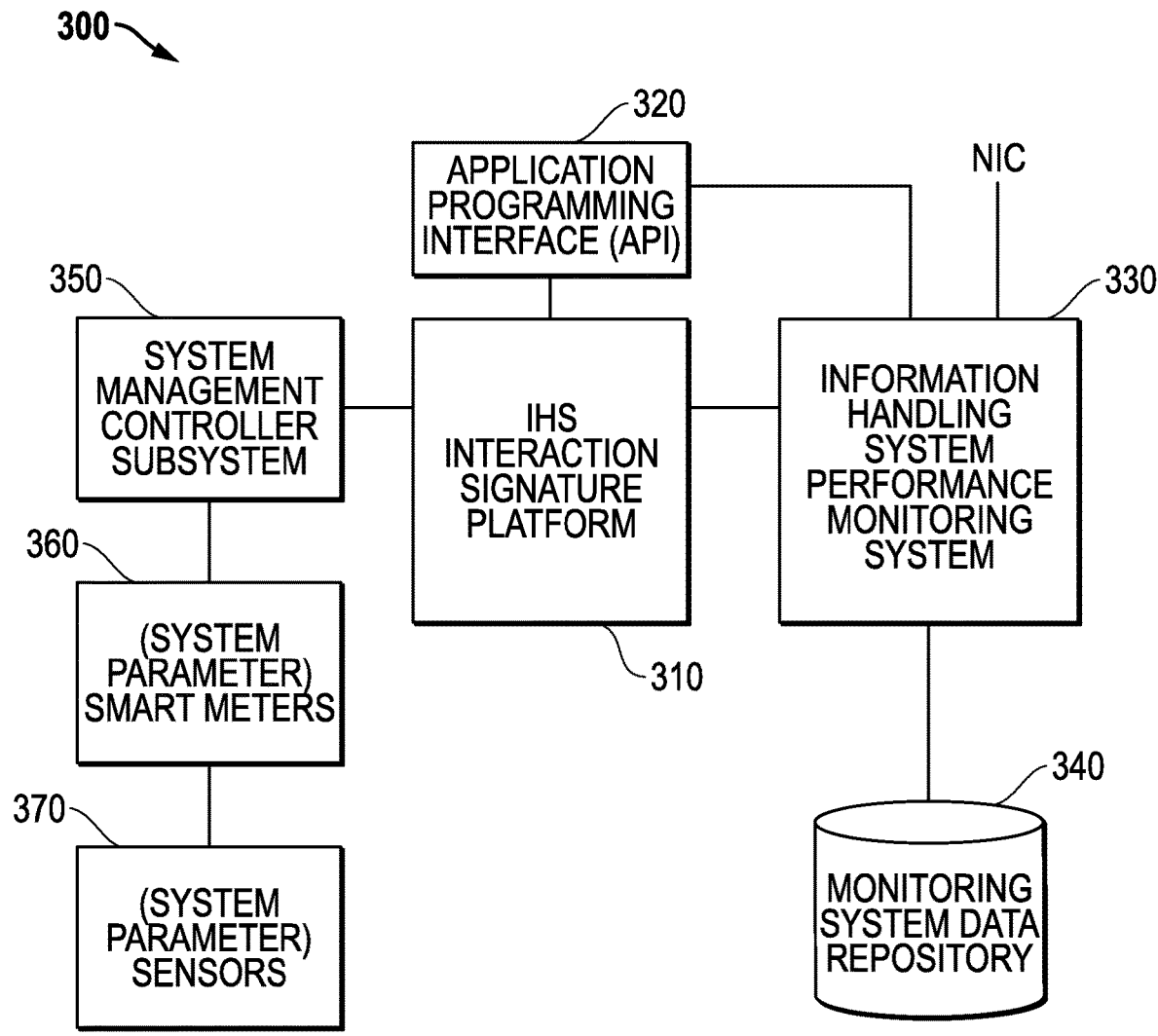
FIG. 3 is a block diagram illustrating components for an aspect of an intelligent system configuration management system with an information handling system interaction signature platform according to an embodiment of the present disclosure.

FIG. 3 is a block diagram illustrating components for an aspect of an intelligent system configuration management system according to an embodiment of the present disclosure. The client information handling system of FIG. 3 may execute code to operate an intelligent configuration management system with information handling system interaction signature platform 310 that coordinates collection of information handling system interaction telemetry data.

The information handling system interaction signature platform 310 associates the information handling system interaction telemetry data with a user of an information handling system. Information handling system interaction telemetry data includes a variety of performance parameters as discussed herein. Performance parameters may be collected relating to hardware, software or firmware applications operating on the client information handling system and with a footprint of drivers, files, libraries, registry entries, processes, threads, services, network ports, or hardware and the like. An intelligent configuration management system agent with information handling system interaction signature platform 310 coordinates collection of event and usage data that can include system-level event data, component-level event data, system-level usage data, and component-level usage data, in a client information handling system.

The intelligent configuration management system agent 310 may coordinate with a system configuration controller sub-system 350 to collect component device utilization data for the client information handling systems and contributing information handling systems. The component device utilization and other performance parameters are associated the client information handling system and software applications operating thereon. A system configuration controller sub-system 350 may include connection to a plurality of system parameter smart meters 360 situated to detect system parameter values from a plurality system parameter sensors 370 of component devices and systems in the client information handling system in some embodiments. These system parameter smart meters 360 and sensors 370 may provide some of the performance parameters that comprise some or all of the information handling system interaction telemetry data for a user. According to one aspect, smart meters 360 may detect power on supply rails to components such as the CPU, GPU, or the full chipset. Additional component devices including displays, various controllers, both wired and wireless network interface systems, memory, disk storage systems, peripheral devices, I/O ports and the like may have smart meters 360 based on sensors 370 situated to detect system performance parameter values relevant to configuration of component devices or similar component devices.

Peripherals among other remotely connected component devices may have intelligent smart meters 360 to report data from system parameter sensors 370 of those information handling system components. In some embodiments, system parameter sensors 370 may be used to identify and measure events and usage relevant to configuration within the information handling system, which may affect performance of the information handling system and a user's perception of such performance. In an aspect, smart meters 360 may monitor system parameter values from the client information handling systems however through peripheral connectors such as USB or similar connections. If this system parameter value measurement for peripherals is not specific to one peripheral, the peripheral component performance levels may be used to provide estimates. Such estimation may be also used for component device system parameter measurements within client information handling systems that may not be outfitted with a complete array of smart meters for component devices in other aspects of the disclosure.

A hardware implementation monitoring and reporting system 330 may monitor performance levels and activity levels of the various component devices or systems of a client information handling system. Such a system will monitor and collect operational activity data and may even include software inventory, software telemetry data, registry history, system parameter event occurrences, hardware inventory and usage measurements. System performance parameter measurement may be coordinated between the information handling system performance monitoring system 330 and the intelligent configuration management system interaction signature platform 310. For operational activity data collected as part of component device utilization data, data points collected may depend on the component device or system being monitored. For example, a processor or controller such as a CPU, utilization factors such as throughput, latency, availability, service times, throttle, ACPI processor states, thread number, processor queue length or other processing performance or utilization measurements may be taken. In some embodiments, system performance parameter measurement may take place via the system management controller subsystem 350 of a client information handling system. Activity of each of the plurality of component devices is monitored by the information handling system performance monitoring system 330, for example a Dell® Data Vault system. With this information, usage of component devices may be determined by the intelligent configuration management system with information handling system interaction signature platform 310 according to detected activity of the variety of component devices and systems. This usage determination may assess factors including measurements for those component devices.

The intelligent configuration management system with information handling system interaction signature platform 310 may comprise a set of instructions run on CPU or embedded controller in the chipset(s). The intelligent configuration management system and information handling system interaction signature platform 310 interfaces with the application programming interface (API) 320 found in the information handling system software to coordinate various software applications including the hardware implementation monitoring and reporting system 330 and monitoring system data repository 340 for storing component device utilization data. The API 320 may further coordinate the intelligent configuration management system application agent 310, the monitoring and reporting system 330, system parameter smart meters 360, system parameter sensors 370, device drivers of various component devices, and other system performance sensors linked with the hardware implementation monitoring system. The API 320 may also coordinate with the system management controller sub-system 350 and also other system management controllers in various embodiments. These aspects work together to monitor system events, component events, system usage, component usage, and other component device utilization measurements in the one or more client information handling systems of a group or enterprise to gather information handling system interaction telemetry data for users.

Component usage and other usage measurements comprise part of the information handling system interaction telemetry data that is reported back to a centralized intelligent configuration management system during operation by a user. In some aspects, the centralized intelligent configuration management system may coordinate event and usage data across an enterprise or other group of information handling system users. For example, the hardware implementation monitoring and reporting system 330 may report component device utilization data via a network interface (NIC) as shown. The reporting may be ongoing, periodic, or in response to requests for data from the intelligent configuration management system operating remotely at a hub server or remote data center. Any method of data reporting to a centralized intelligent configuration management system is contemplated. The component device utilization data recorded for client information handling systems is also granular in that it may be broken down by component devices within the client information handling systems for particular users. Component device utilization data is coordinated with operational measurements to identify trends in operation and habits of users of client information handling systems as discussed further herein. Other data may be recorded as well. This may include time/date data, global positioning system information, usage of AC power sources versus battery usage, and the like. This data may also be included in component device utilization data as well as identifying information relating to the client information handling systems that are part of the enterprise or group.

In some embodiments, an intelligent configuration management system and information handling system interaction signature platform may operate on-box in one or more client information handling systems. In such an embodiment, the monitoring system data repository 340 having component device utilization data may be utilized by the on-box information handling system interaction signature platform 310 to prepare event and usage data specific to the client information handling system. In such cases, crowd-sourced data from other client information handling systems with other users during operation may be received by the client information handling system hosting an on-box information handling system interaction signature platform 310 of the intelligent configuration management system to assist in analysis.

The information handling system performance monitoring system 330 may operate to gather, coordinate, and store performance parameters from both the client information handling system and the contributing information handling systems. The performance parameters of the information handling system interaction telemetry data are associated with user via user identification credentials during a learning phase of the information handling system interaction signature platform 310. The information handling system interaction telemetry data may be stored locally or remotely at a monitoring system data repository 340. In some aspects, crowd-sourced aggregate information handling system interaction telemetry data associated with other users may be received from a remote location to a local monitoring system data repository 340. The crowd-sourced aggregate information handling system interaction telemetry data associated with other users is used by the interaction signature platform as a reference for comparison of system performance parameters during a user interaction.

The learning phase of operation of the information handling system interaction signature platform 310 may gather data for a user interaction with a client information handling system to determine indirect identifiers for the user. A similar procedure may gather data from a plurality of users which is collected and then used as comparison reference to determine the indirect identifiers associated with a particular user for the client information handling system as described in the present disclosure. The reference aggregated information handling system interaction telemetry data may be gathered from the client information handling system or crowd-sourced from a variety of information handling systems.

The hardware implementation monitoring and reporting system 330 may receive data from a plurality of sensor systems. Sensors can include software and hardware detection mechanisms known in the art to determine performance levels or operation activity of the component devices. It may include additional sensors such as orientation sensors, temperature sensors, data throughput or processing detection systems, and other component device performance detection systems. Orientation sensors, for example, may include one or more digital gyroscopes, accelerometers, and magnetometers in example aspects. As another example aspect, temperature sensors may include thermistors or other temperature sensing systems. Sensor system data may be accumulated at an accumulator sensor hub.

Figure 4:
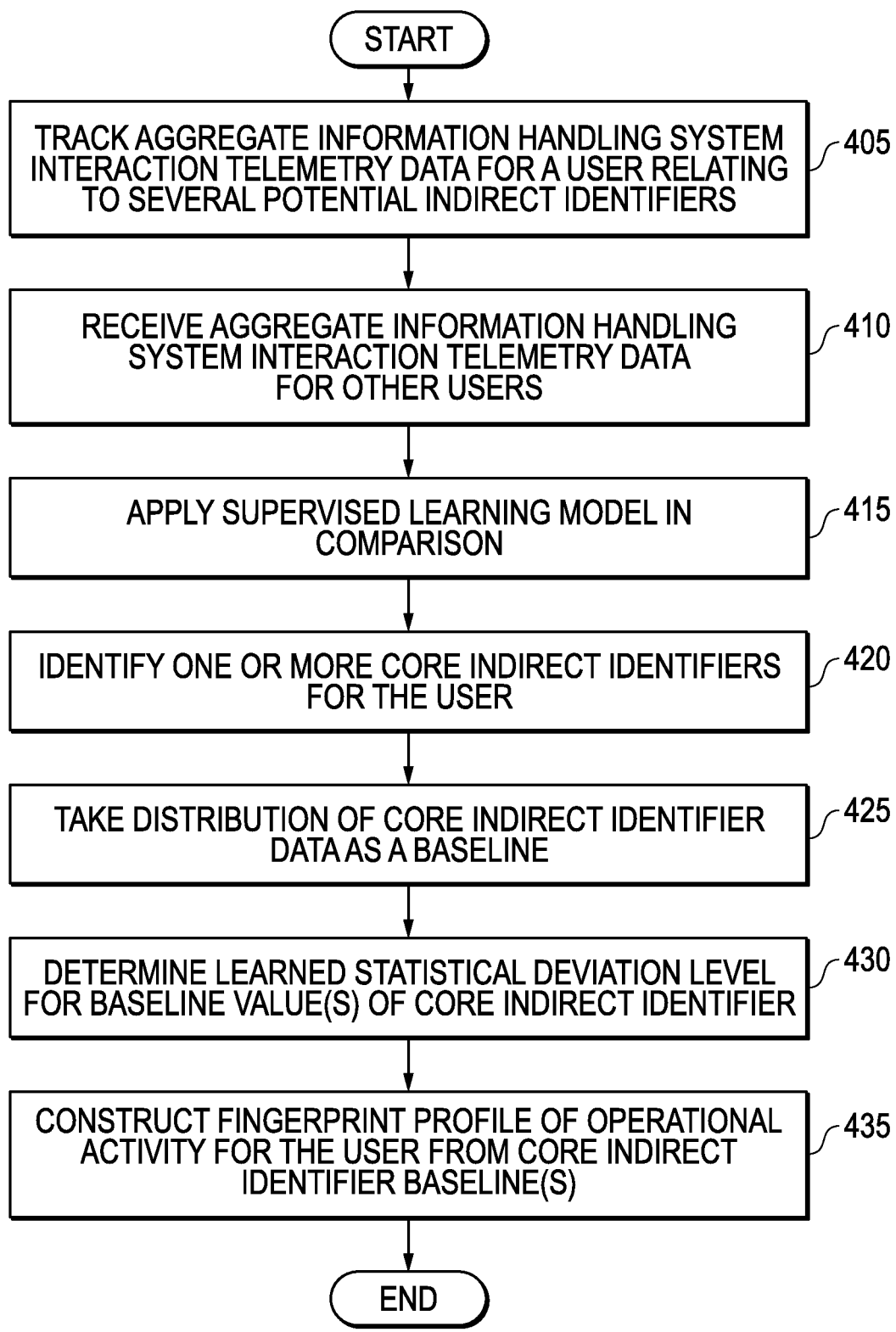
FIG. 4 is a flow diagram illustrating a method of determining fingerprint profiles of operational activity by an information handling system information handling system interaction signature platform according to an embodiment of the present disclosure.

FIG. 4 is a flow diagram illustrating a method of information handling system configuration management according to an embodiment of the present disclosure. In an aspect, FIG. 4 illustrates an embodiment of an information handling system interaction signature platform operating during a learning phase of a user interaction with a client information handling system.

The method begins at 405 where the information handling system interaction signature platform operates with the information handling system performance monitoring system to track interaction telemetry data for a user on a client information handling system. In an example embodiment, user identification credentials may be associated with the tracked interaction telemetry data during the learning phase. This learning phase tracked interaction telemetry data for the client information handling system establishes a background level of data to be associated with the user's interaction. The tracked information handling system interaction telemetry data includes a plurality of performance parameters or a combination of parameters. Any of the one or more performance parameters may be determined to be indirect identifiers useful in indicating a user's interaction. In later phases, the information handling system interaction signature platform will measure information handling system interaction telemetry data during an interaction with the client information handling system. Measurement of performance parameters during an interaction will be used to determine either a match or a non-match with the indirect identifiers determined from interaction telemetry data collected during the learning phase.

At 410, the interaction signature platform may retrieve aggregate information handling system interaction telemetry data for a plurality of other users during the learning phase. The aggregate information handling system interaction telemetry data for the plurality of other users may be retrieved from a monitoring system data repository. In one aspect, the client information handling system may store interaction telemetry data from other users locally or remotely to the monitoring system data repository. In other aspects, many contributing information handling systems may crowd-source aggregate information handling system interaction telemetry data to a remotely located monitoring system data repository. Aggregate information handling system interaction telemetry data for a variety of users may be retrieved from the remotely located monitoring system data repository in some embodiments. The random variety of interaction telemetry data is used in establishing a comparison basis for determining indirect identifiers. With a comparison basis drawn from interaction data of a variety of other users, the uniqueness of performance parameters to a user of the client information handling system may be discerned according to the present disclosure. It is understood that the client information handling system may also contribute tracked user information handling system interaction telemetry data to a crowd-sourced information handling system database. The contributed interaction telemetry data may in turn be used by other information handling systems in determining fingerprint profiles of operational activity by users of those systems to reveal unique indirect identifiers.

Proceeding to 415, the interaction signature platform may apply a supervised learning model in comparing the tracked aggregate information handling system interaction telemetry data for the user being analyzed with aggregate information handling system interaction telemetry data from a plurality of other users. Any of several supervised learning models may be applied to learn a user's interaction with the client information handling system by determining indirect identifiers that make that interaction unique. In example embodiments, the supervised learning models for data mining to discern indirect identifiers may include Naïve Bayes classifier, Random Forest classification, K-Nearest Neighbor classification, Boosted Classification trees, Neural Network classification, Support Vector Machine classification, or similar supervised learning model algorithms. These supervised learning algorithms may be used for classification and regression to determine performance parameters of a user of the client information handling systems that fall into a distinct classifications from performance parameter data received from the plurality of other users and other information handling systems.

At 420, one or more performance parameters are determined to be in a distinct classification for the user of the client information handling system as compared to a random population of user interaction performance parameters. These distinct performance parameters may be designated to be one or more indirect identifiers unique to the user's interaction. The one or more core indirect identifiers unique to a user's interaction may form a fingerprint profile of operational activity by the user. This fingerprint profile of operational activity is constructed for later use in verifying the user or yielding indication that someone other than the user is interacting with a client information handling system.

Figure 5A:
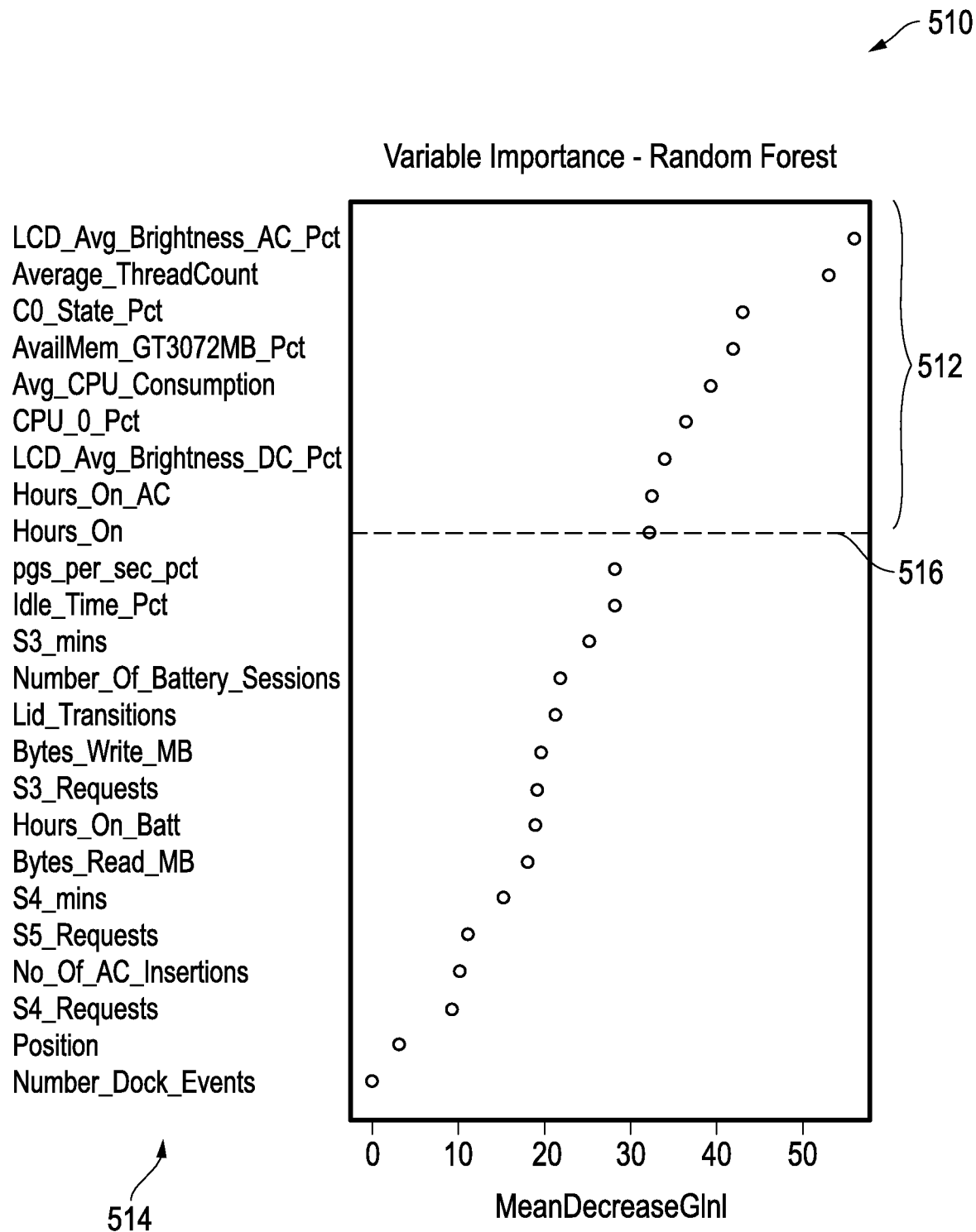
FIG. 5A is a diagram illustrating an example of an interaction profile of operational activity by a user of an information handling system according to an embodiment of the present disclosure.
Figure 5B:
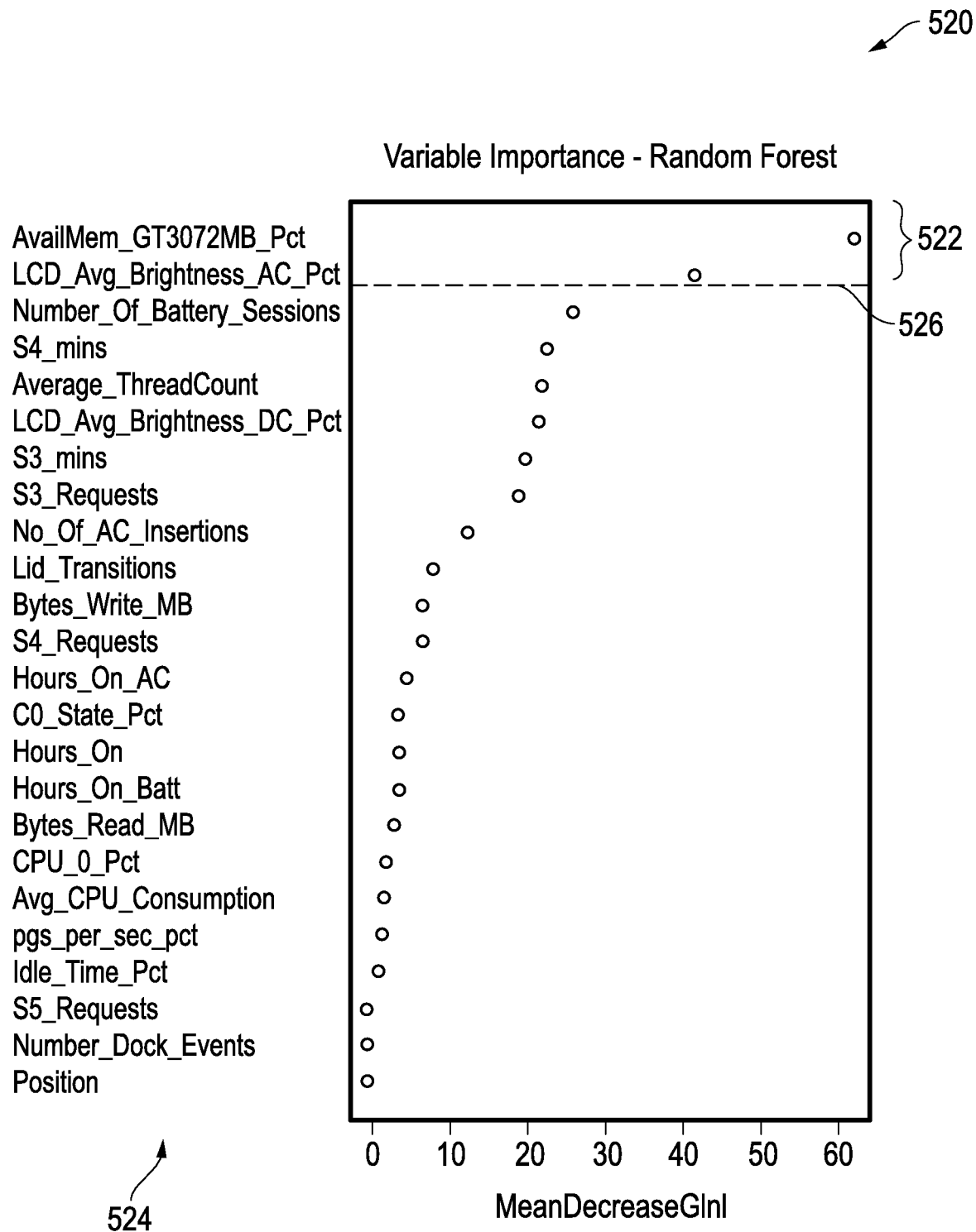
FIG. 5B is a diagram illustrating another example of an interaction profile of operational activity by a user of an information handling system according to an embodiment of the present disclosure.
Figure 5C:
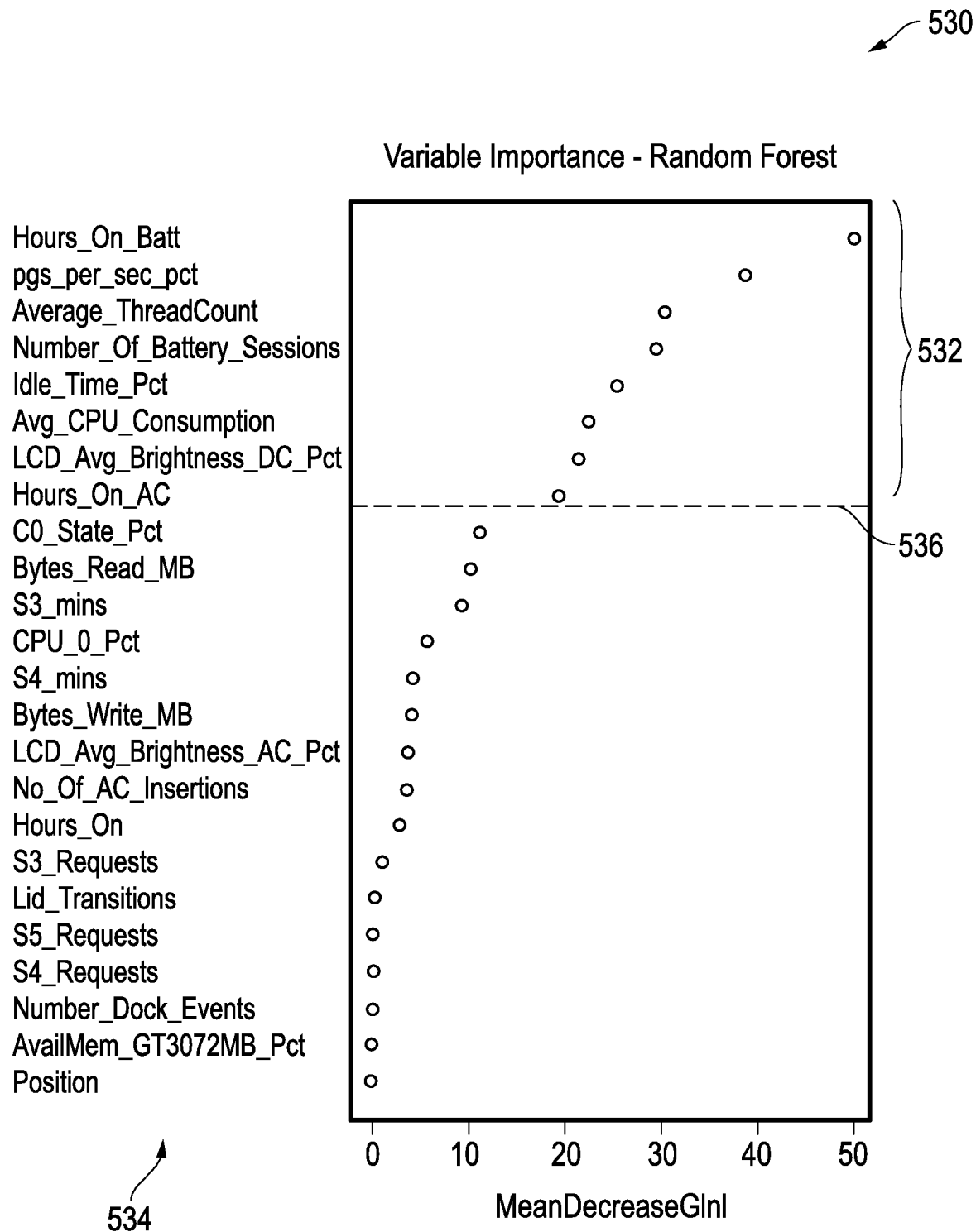
FIG. 5C is a diagram illustrating yet another example of an interaction profile of operational activity by a user of an information handling system according to an embodiment of the present disclosure.

Several example interaction profiles of operational activity of users are shown in FIG. 5A, FIG. 5B and FIG. 5C at 510, 520 and 530 respectively. For each user fingerprint profile of operational activity 510, 520, and 530, a distinct supervised learning model algorithm may be applied to determine the indirect identifiers in some example embodiments. The interaction profile of operational activity shown at 510, 520, and 530 for users of the client information handling system illustrates application of the Random Forest supervised learning model algorithm. It is understood that other supervised learning algorithms may yield similar interaction profiles.

In FIG. 5A, an operational profile for a user where application of the Random Forest supervised learning model to distinguish indirect identifiers 512 is shown at 510. As may be seen, a plurality of performance parameters 514 are shown and discussed further below. The variable importance in identifying a user interaction based on distinct classification 516 is illustrated in the graphical representation of the fingerprint profile of operational activity by the user 510 of the client information handling system. Distinct classification 516 shows the line above which performance parameters may be consider indirect identifiers 512 since they are distinct relative to crowd-sourced data for other users. In this particular example of 510, the trend of several performance parameters is somewhat linear so several performance parameters may be useful as core indirect identifiers 512 due to relative variable importance. The indirect identifiers 512 may be selected due to their distinction. Those indirect identifiers 512 may then form the fingerprint profile of operational activity of a user used by the interaction signature platform when identifying the user operating on the client information handling system. In some embodiments, the other performance parameters in the operational profile 510 may not necessarily be retained for the purposes of user interaction identification via a fingerprint profile. Example learned indirect identifiers 512 from interaction profile of operational activity 510 include LCD average brightness when AC is attached as a percentage of time interacted by a user. Additional learned identifiers 512 include average threadcount, time of processing apps as a percentage of time in an interaction (C0_State_pct), available memory greater than about 3GB as a percentage of operation time, average CPU consumption, CPU idle time percentage (CPU_0_Pct), LCD average brightness with DC connected as a percentage, hours on when AC is attached, and hours on levels. Additional performance parameters in this example could be used in some embodiments of 510 due to the linear nature of the interaction profile if the distinct classification level 516 were relaxed. This setting of distinct classification level 516 may be manipulated to affect the sensitivity of the interaction signature platform in some embodiments.

FIG. 5B shows another example interaction profile of operational activity 520 by the user of the client information handling system, where fewer performance parameters are unique and stand out as useful core indirect identifiers 522 of the user. In the example embodiment, the distinct classification 526 yields only two indirect identifiers 522 from interaction profile of operational activity 520. Those include available memory greater than about 3GB as a percentage of operation time and LCD brightness with AC connected as a percentage. These indirect identifiers 522 are drawn from the set of performance parameters 524 analyzed and determined to be distinctly classified from usage by other users when compared against crowd-sourced data via a supervised learning model algorithm. The set of learned indirect identifiers then comprises a fingerprint profile of operational activity of a user of the client information handling system.

FIG. 5C shows yet another example interaction profile of operational activity 530 by the user of the client information handling system, several performance parameters are unique and stand out as useful core indirect identifiers 532 of the user. In the example embodiment, the distinct classification 536 yields eight indirect identifiers 532 from performance parameters 534 analyzed in the interaction profile of operational activity 530. Those indirect identifiers 532 include hours on when battery is being used, memory pages per second during operation, average threadcount, number of battery sessions, idle time percentage, average CPU consumption, LCD average brightness with DC connected as a percentage, and hours on with AC. These indirect identifiers 532 are drawn from the set of performance parameters 524 analyzed. The indirect identifiers 532 are determined to be distinctly classified 536 from usage by other users when compared against crowd-sourced data via a supervised learning model algorithm. The distinct classification level 536 may be adjusted in some embodiments to adjust the sensitivity which may include or exclude certain indirect identifiers 532. However, the algorithm applied will yield indirect identifiers which may then comprise a fingerprint profile of operational activity of a user of the client information handling system.

It is understood that the above examples 510, 520, and 530 reflect exemplary bodies of data for illustrative purposes only. Measure performance parameters and crowd-sourced data may yield a variety of results. Further, several performance parameters may be used in addition to those shown in the above examples and in yet other example embodiments some or all shown performance parameters may not be used.

During the learning phase of operation of the interaction signature platform on a user's interaction of a client information handling system, several interaction data sets may be taken over numerous interaction episodes. For example, the Table 1 below shows example aggregate information handling system interaction telemetry data sets that may be collected with respect to a user of a client information handling system. Similarly, aggregate information handling system interaction telemetry data sets received from other user's interactions with the client or contributing information handling data sets is also illustrated. It is understood that for purposes of illustration only a small number of performance parameters are include in Table 1. Similarly, limited datasets for a client user or other users are included for purposes of illustration.

Variations in aggregate information handling system interaction telemetry data sets in Table 1 reflect differences in information handling system user habits. Again, the data reflected below in Table 1 is purely exemplary for purposes of illustration.

flow may proceed to 425. At 425, interaction telemetry data for the selected indirect identifiers may be further analyzed in some aspects. The interaction signature platform may establish baselines of operational value levels for the indirect identifiers. The baseline values for the one or more indirect identifiers may then serve as usage signature baselines for the fingerprint profile of operational activity by the user. Thus, the baseline value of the one or more indirect identifiers may indicate interaction unique enough to identify the user. The application of supervised learning models determines statistically distinct classifications for the indirect identifiers selected. As a result, which indirect identifiers have statistically distinct classifications are learned from the aggregated information handling system interaction telemetry data for the user when compared to data of other users as described.

The usage signature baseline for the indirect identifiers may be established from the interaction telemetry data collected for that performance parameter during the learning phase. The usage signature baseline may comprise any of several forms depending on the data. For example, an average or median level may be used as a baseline value level for an indirect identifier. In other aspects, a range of values or a mean combined with a measure of variations such as a standard deviation may be used as a baseline.

In some embodiments, the baseline may be a statistical distribution of values for measured performance parameters in the interaction telemetry data for a user. In some aspects the distribution may be tailored to eliminate outlier values as is understood. For example, a baseline may be a distribution between $95^{th}$ percentile values. Other banded distributions of values may be used instead. In example aspects, the bands may be narrow or broad to affect sensitivity depending on business needs such a high security applications and vice-versa.

In one example embodiment, a population distribution of interaction telemetry data values for a performance parameter serving as an indirect identifier is used to establish baseline levels of operational performance. The distribution of data is drawn from performance parameter measurements across user interactions with a client information handling

TABLE 1

| Brightness | Keystroke Pct. of time used | Key typing rate (/min) | Orientation | Touchpad use | Time of processing apps | # of Apps open | Avg. CPU consumption | Label |
|---|---|---|---|---|---|---|---|---|
| 100% | 30% | 22 keystrokes | Vertical | Medium | 75% | 85 | 80% | Client user |
| 90% | 40% | 30 keystrokes | Horizontal | Medium | 60% | 67 | 74% | Client user |
| 97% | 23% | 22 keystrokes | Vertical | High | 79% | 77 | 92% | Client user |
| 95% | 35% | 40 keystrokes | Horizontal | Minimal | 55% | 45 | 63% | Client user |
| 80% | 55% | 60 keystrokes | Vertical | Minimal | 30% | 7 | 30% | Other user |
| 60% | 58% | 98 keystrokes | Vertical | Minimal | 26% | 26 | 26% | Other user |
| 40% | 74% | 140 keystrokes | Horizontal | Medium | 38% | 6 | 38% | Other user |
| 90% | 60% | 79 keystrokes | Horizontal | High | 40% | 31 | 40% | Other user |

Returning to FIG. 4, after determination of one or more core performance parameters useful to identify a user's interaction with a client information handling system at 420, system. In a further aspect, the baseline in some embodiments may be a bounded population distribution. The population distribution may be bounded at one end or both ends at 99%, 95%, 90% or the like. This may be done by establishing an outlier threshold limitation such as by applying a population distribution bars at 95% of the data or population bars between 5% and 95% of the population data.

Proceeding to 430, a statistical deviation level may be applied to the usage signature value levels for the learned indirect identifiers. In one example aspect, application of a statistical deviation may be applied to a mean or median value in some embodiments. From that average or median value, the information handling system may apply a statistical deviation from the mean or median value as an acceptable threshold for determining whether measured interaction telemetry data during monitoring of the client information handling system falls within that statistical deviation range. This will serve as a range of acceptable measured interaction telemetry data for a performance parameter that indicates a match to the indirect identifier in some example embodiments.

In other embodiments, a distribution range of values may serve as a baseline for an indirect identifier. Measured performance parameter values during a user interaction may then be taken and a distribution of measured performance parameters values compared to the baseline distributions of the indirect identifier corresponding to the same performance value. It is understood that the statistical deviation level of the usage signature baseline for an indirect identifier distribution is a permitted deviation amount of a statistical distribution of values of the measured performance parameter data corresponding to the indirect identifier.

At 435, the information handling system user interaction signature platform establishes the fingerprint profile of operational activity based on the selected indirect identifiers. As part of the one or more indirect identifiers in the fingerprint profile of operational activity, one or more indirect identifiers may have the usage signature baselines established and further one or more may include the learned statistical deviation levels for those usage signature baselines. At this point the process of FIG. 4 may end.

Figure 6A:
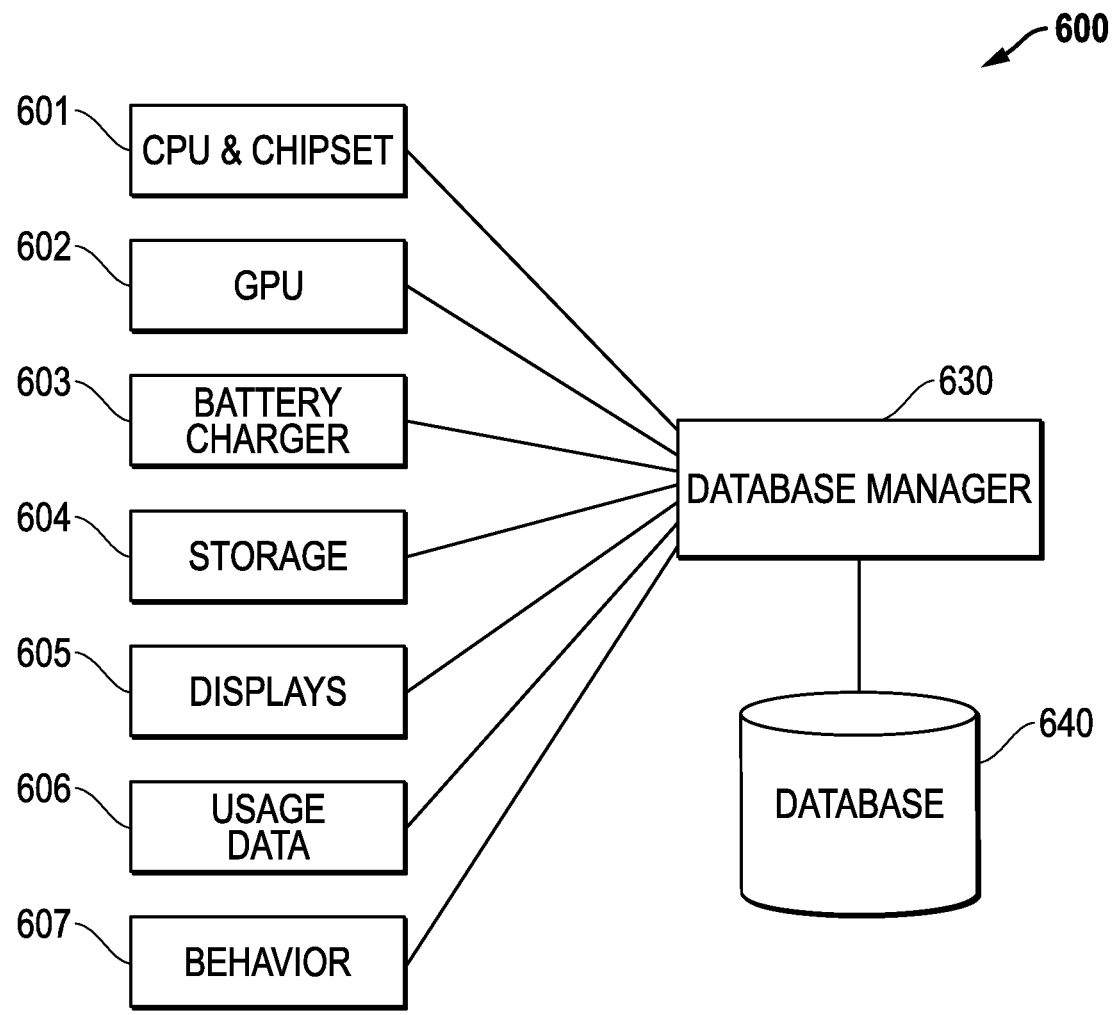
FIG. 6A is a block diagram illustrating components for another aspect of an intelligent configuration management system according to an embodiment of the present disclosure.
Figure 6B:
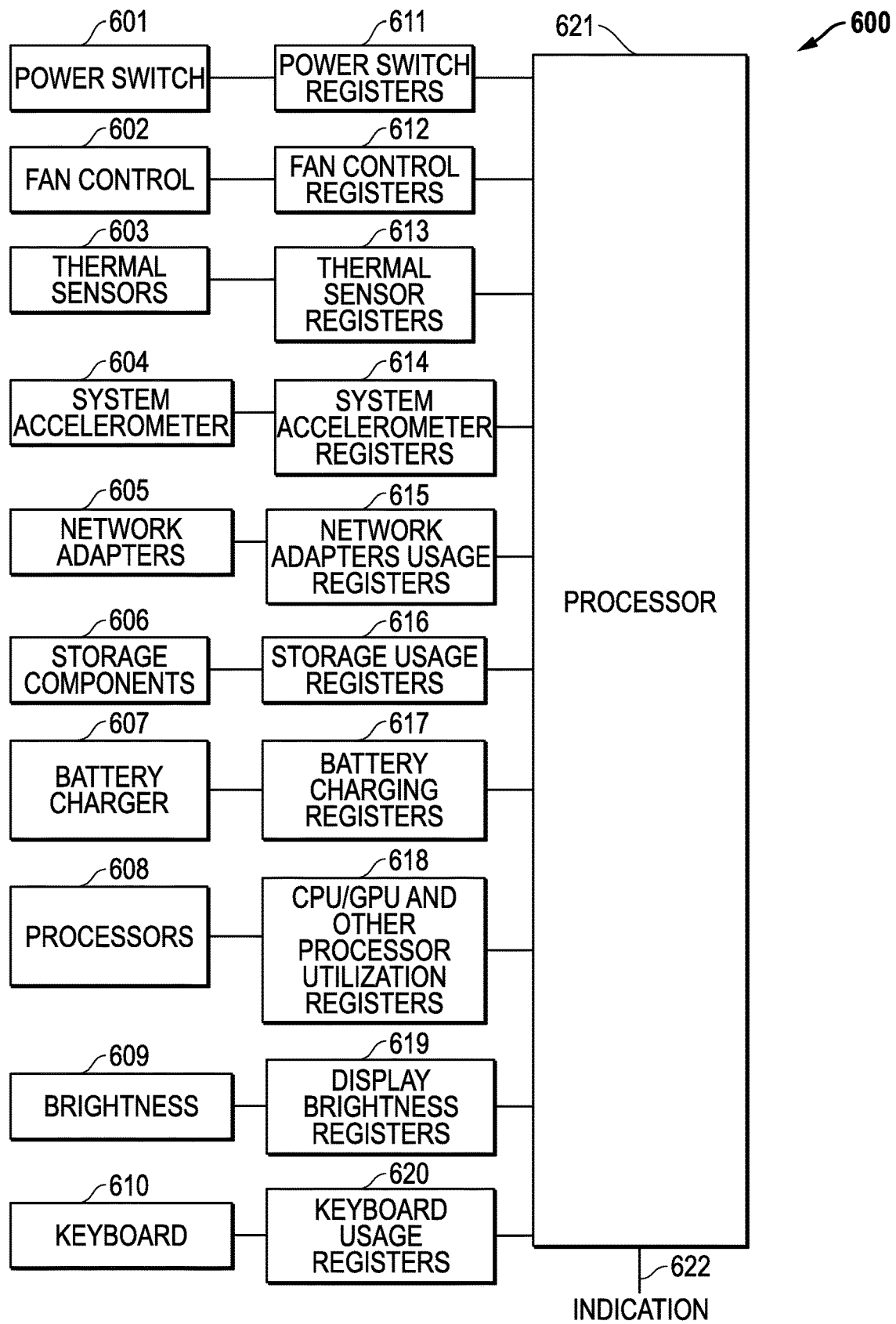
FIG. 6B is a block diagram illustrating components for another aspect of an intelligent configuration management system according to an embodiment of the present disclosure.

FIG. 6A and FIG. 6B illustrate block diagrams of measured performance parameters at client and contributing information handling systems for comparison via the information handling system interaction signature platform.

FIG. 6A illustrates by graphic depiction the process of component device historical usage data collection including collection of usage and configuration information for a user during periods of interaction via the intelligent configuration management system of the present disclosure. Components, which can include, for example, CPU & chipset 601, GPU 602, battery charger 603, storage 604, displays 605, usage data 606, and system-wide behavior information monitoring 607, and other configuration and performance parameter values are reported via database manager 630. Database manager 630 is operatively coupled to database 640. The assortment of component devices or systems monitored for events and usage affecting performance and configuration is shown at 601 through 607 and measurements may be reported to and stored in a monitoring system data repository. In an example embodiment, the database may work parallel to or be part of the hardware implementation monitoring database such as the Dell® Data Vault (DDV) system. The present embodiment may include power measurements made from power supply rails to component devices including the CPU, chipset, GPU, battery charger, storage/drive devices, displays, and other component devices as described above. Each monitored client information handling system, as described, may have intelligent configuration management system agents conduct event and usage data collection.

The monitoring and reporting system operating on the monitored client information handling system may report event and usage data and other component device utilization data back to the centralized intelligent configuration management system and the monitoring system data repository. Based on user identification credentials, this reported information handling system interaction telemetry data may be associated with a user in some aspects. In other aspects, this measured information handling system interaction telemetry data from a client information handling system may be compared or contrasted with a fingerprint profile of operational activity associated with a user's identification credentials.

Other components, such as peripherals or network connected devices operating via the client information handling system may have event and usage measurement of their own available. In other aspects, usage and performance estimates for these peripherals or network connected devices may be made based on duty cycle of power consumption, component device operation, or monitoring of total system events and usage data and performance parameter values of components, drivers, systems, buses or the like utilized by the peripheral devices.

Intelligent configuration management system assesses overall event and performance parameter usage data for the various component devices of the contributing and client information handling systems for the information handling system interaction signature platform. The event and usage data, along with additional component device utilization data, may be used to determine time-series data representing usage and performance estimations for user interactions according to statistical models applied. In an example embodiment for a monitored client information handling system, component device power consumption measurements may be summed to provide a total power consumption level during a period of interaction by a user. Data from a plurality of client information handling systems may be then summed or extrapolated across a population of contributing information handling systems in accordance with operation of the information handling system interaction signature platform described herein.

FIG. 6B is a graphical chart illustrating another example of contributing and client information handling system architecture for performance parameter measurement or estimation. A series of performance and configuration parameter values are illustrated according to an embodiment of the present disclosure. An example of a contributing or client information handling system 600 in accordance with such an embodiment comprises power switch 601, fan control 602, thermal sensors 603, system accelerometer 604, network adapters 605, storage components 606, battery charger 607, processor utilization sensor 608, display brightness setting sensor 609, peripheral device usage sensor 610, and other sensors and data sources not shown. Client information handling system 600 may also comprise registers that relay data collected from various sensors. These may include power switch registers 611, fan control registers 612, thermal sensor registers 613, system accelerometer registers 614, network adapter usage registers 615, storage usage registers 616, battery charging registers 617, and CPU/GPU or other processor utilization sensor registers 618, display brightness setting registers 619, keyboard keystroke or other peripheral device registers 620. Client or contributing information handling system 600 comprises processor 621, which monitors the sensors and other data sources via their respective registers and provides indication 622. Information from sensors and other sources 601-610 of an information handling system, as can be obtained by processor 621 via registers 611-618, can be used to provide indications, such as indication 622, of performance parameter measurement levels for information handling systems during periods of interaction with a user. Additional performance parameter measurements may be similarly received for the information handling system interaction signature platform. Those are described in additional detail elsewhere herein but may include processor thread count levels, hours-on times with AC or DC connection, duration times in various sleep states, idle times of various component devices, processing time percentages, orientation of the information handling system, audio level settings, numbers of applications open or concurrently running, opening or closing of laptop device screens, memory pages per second, software application duration times, bytes read or written, I/O data flow operation, event log frequency, and software application or system crash occurrences. Additional interaction performance parameters may include interaction telemetry data for user interaction with peripheral devices such as keyboard function, speed, displacement rates, cursor control device interaction data such as from gesture detection, mouse, touchpad, touch screen or similar peripheral devices. This data may be used as described above with respect to the information handling system interaction signature platform described in the disclosure herein.

Figure 7:
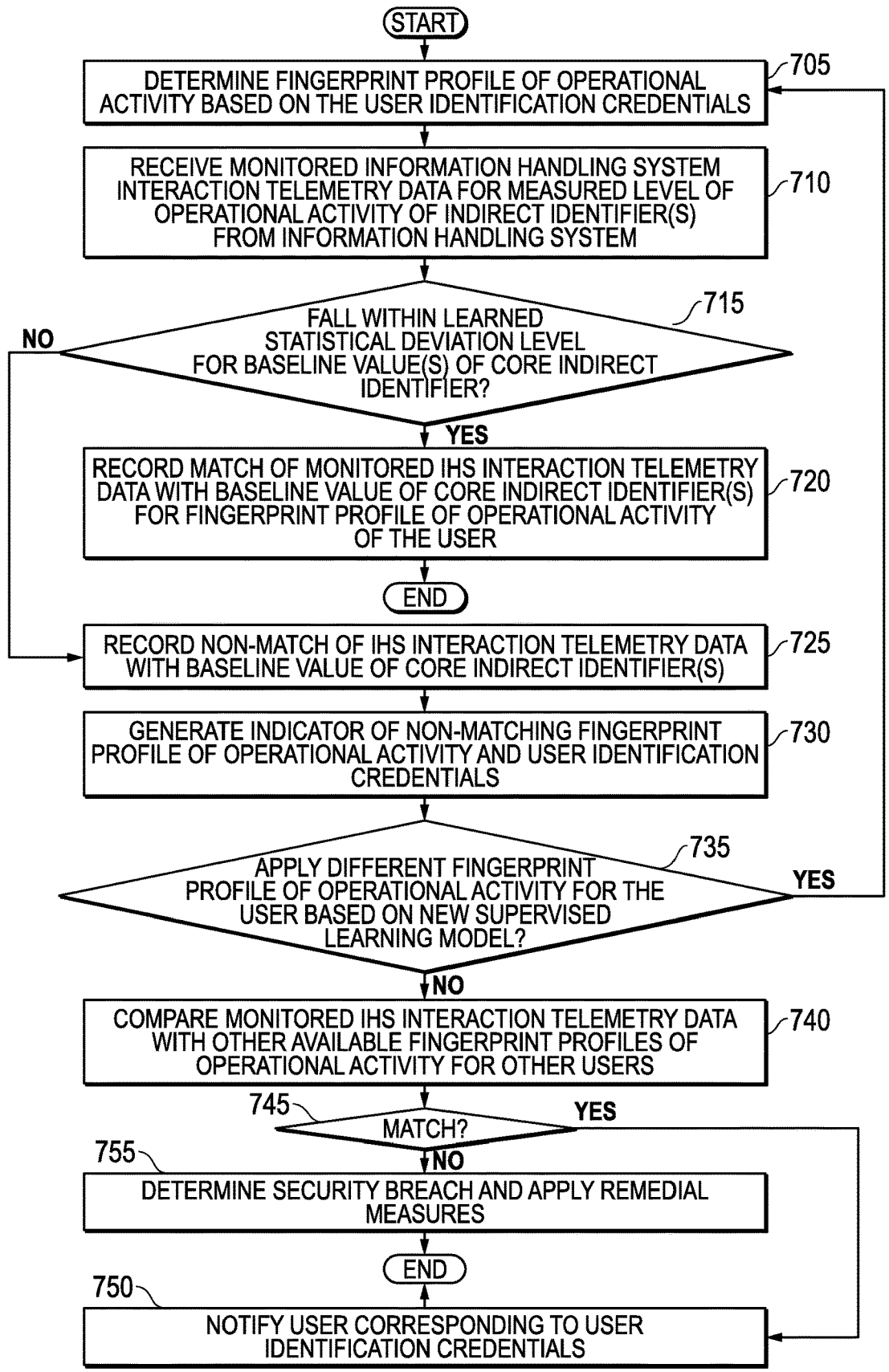
FIG. 7 is a flow diagram illustrating a method of user determination with an information handling system interaction signature platform according to an embodiment of the present disclosure.

FIG. 7 is a flow diagram illustrating a method of operation of an information handling system interaction signature platform on a client information handling system. In an aspect, the information handling system interaction signature platform is used to determine whether an ongoing user interaction fits with a fingerprint profile of operational activity associated with a set of user credentials supplied for the interaction.

The method begins in block 705. At 705, a client information handling system may receive user identification credentials. The user identification credentials may comprise any number of things for security verification or identification of a user. For example, a login or password may be used to identify a user in some embodiments. In other embodiments, biometric authorization or other user credentials may be submitted for access to a client information handling system and may serve as user identification credentials. It is understood, that access may still be made under a false guise of authorization, but that the information handling system interaction signature platform may provide a way of detecting unauthorized access.

With the user identification credentials, the information handling system interaction signature platform may access stored a fingerprint profile of operational activity associated with the user identification credentials that was previously constructed during a learning phase. In example embodiments, the fingerprint profiles of user operational activity include one or more indirect identifier determined according to examples describe herein. Further, a fingerprint profile of operational activity may include a usage signature baseline of the one or more indirect identifiers in some embodiments. In additional embodiments, the usage signature baseline may further include a statistical deviation range to which measured interaction telemetry data for performance parameters may be compared.

The information handling system interaction signature platform receives monitored information handling system interaction telemetry data for measured performance parameters during a user interaction. The user interaction with the client information handling system is being monitored pursuant to access via user identification credentials at 710. In an aspect, the information handling system interaction signature platform gathers interaction telemetry data for performance parameters corresponding to the indirect identifiers of the fingerprint profile of operational activity for the user. As data is gathered during the period of interaction with the client information handling system under the user identification credential, it is compared with the usage signature baseline for the indirect identifier in some embodiments.

The information handling system interaction signature platform proceeds to 715 to determine if the measured performance parameters corresponding to indirect identifiers falls within the learned statistical deviation level for the usage signature baseline. In at least one aspect of the disclosure, each of the one or more indirect identifiers in the fingerprint profile of operational activity for the user is analyzed at 715. If a measured performance parameter level falls within a statistical deviation level for the baseline of the indirect identifier, the information handling system interaction signature platform determines that a match exists with the indirect identifier. Sensitivity of the information handling system interaction signature platform may be adjusted based on tolerances of the learned statistical deviation levels from the usage signature baselines for the indirect identifiers. Closer statistical deviation requirements will yield a more sensitive information handling system interaction signature platform. More relaxed statistical deviation requirements may reduce false positives for non-matching users but may be less sensitive in detection.

If a plurality of indirect identifiers are analyzed at 715, some level of matching measured performance parameters in recorded interaction telemetry data will yield a determination of a match to user identification credentials in some embodiments. In other embodiments, if even one measured performance parameters falls outside the statistical deviation from a baseline for an indirect identifier value, then this may trigger a non-match conclusion. Sensitivity of the information handling system interaction signature platform to detecting unauthorized usage versus false positive determination may also be balanced in settings of how many non-matched indirect identifiers yields a determination that the user does not match user identification credentials.

Upon determination of a match between measured performance parameters and indirect identifier usage signature baselines during a period of user interaction, then flow may proceed to 720. At 720, a record of the match is stored for the period of the user interaction. The record of a match may be stored in the monitoring system data repository in some embodiments. Further, the recorded performance parameters deemed to match a user may be contributed to additional learning for determination of indirect identifiers in one aspect. In another aspect, matched performance parameter interaction telemetry data may also be contributed to further establishing usage signature baseline levels for the corresponding indirect identifiers in some embodiments. In yet other embodiments of the present disclosure, the recorded interaction telemetry data verified as matching a user may be contributed to a crowd-sourced monitoring system data repository. Then this matched user interaction telemetry data may be used as a comparison bases to determine indirect identifiers on other client information handling systems in accordance with descriptions herein. At this stage the process may end. It is understood, however, that ongoing measurement of performance parameters may take place during a period of user interaction pursuant to user identification credentials. It is further understood that periodic determination of a match or non-match of user interaction with the user identification credentials may be made pursuant to the disclosure herein.

Upon determination of a non-match between measured performance parameters and indirect identifier usage signature baselines during a period of user interaction at 715, then flow may proceed to 725. At 725, a record of the non-match is stored for the period of user interaction. Which of the one or more indirect identifiers is non-matched may be recorded as well. Data may also be recorded for the time and duration of the non-matched user interactions. In some embodiments, a record may also be made of other aspects of the non-matched interaction including recording all performance parameter user interaction telemetry data during the interaction period.

The information handling system interaction signature platform will proceed to 730 to generate an indicator of the non-matching fingerprint profile of operational activity for the user associated with the user identification credentials. In some embodiments, the indicator may be sent to a user at a contact location such as an email or text. In other embodiments, the indicator notification may be displayed on the client information handling system during operation or during a next log in. In yet other embodiments, an indicator of the non-match may be sent to an IT administrator for the information handling system. Other indications of the non-match between an ongoing user interaction and the indirect identifiers of the fingerprint of operational activity of the user are contemplated as is understood available to those of ordinary skill. In some aspects, details about the non-matched interaction may be provided with the non-match indication including details described herein.

At 735, the information handling system interaction signature platform may determine if application of another fingerprint profile of user operational activity is warranted to determine if a false non-match has been encountered. For example, a fingerprint profile of operational activity for a user determined by a different supervised learning model may be applied to yield a distinct set indirect identifiers or usage signature baselines for the indirect identifiers. By doing so, the usage interaction may prove to be a match under a second analysis and avoidance of a non-match indication may be made if unnecessary. If a new fingerprint profile of operational activity of a user is to be used is to be used, then the method returns to 705. The process will repeat with the new fingerprint profile of operational activity for the user based on a different supervised learning model to assess whether a user interaction matches or does not. The steps of FIG. 7 may be repeated with the new fingerprint profile of user operational activity.

If no new fingerprint profile of user operational activity is to be assessed to eliminate a false non-match, flow may proceed to 740. At 740, the information handling system interaction signature platform may search among available fingerprint profiles of operational activity for other users of the client information handling system that may be stored within a monitoring system data repository. In an example embodiment, a limited number of users may have physical access to a client information handling system. For example, an enterprise may have a limited number of users in one aspect. Some or all of that limited set of known users may have stored fingerprint profiles of operational activity for the client information handling system. Comparison may be made according to embodiments recited herein with the fingerprint profiles of operational activity of each of the known set of other users. The information handling system interaction signature platform will proceed to 745 to determine whether a match to another user is found despite the supplied different user identification credentials being associated with a user interaction. If a match is made with a different known user using incorrect user identification credentials at 745, flow proceeds to 750.

At 750, the information handling system interaction signature platform may transmit notification of the unauthorized interaction to the user and identify the different known user associated with the detected non-matched interaction with the client information handling system under the wrong user identification credentials. In some embodiments, notification of another known user using the wrong user identification credentials may be made to an IT administrator or the like. At this point, the process may end.

If no match is made with another known user at 745, the information handling system interaction signature platform may proceed to 755. Since the state of the information handling system interaction signature platform determination is a non-match between a user interaction and a fingerprint profile of operational activity for a set of user identification credentials, a conclusion may be drawn of a security breach. Further, the information handling system interaction signature platform determination of a non-match may trigger remedial measures. Several security remedial measures may occur. Notification as described above may be one remedial measure. Notification indicating a suspected security breach and including the reasons for the determined non-match such as what measured activity appears to be not matched with the user may be provided in the notification. In other aspects however, a generalized description of the non-matching performance may be made to avoid revealing the learned indirect identifier or indirect identifiers triggering the non-match. This may provide an additional measure of security in some embodiments. Knowledge of specific performance parameters corresponding to indirect identifiers may be used to circumvent the information handling system interaction signature platform.

In additional embodiments, remedial measures may include isolating a client information handling system or isolating portions of the system resources to protect from a security breach. In yet other embodiments, an additional level of security may be required to proceed. The additional level of security may be secondary password, security question, biometric security measure or some other secondary security requirement. At this point the process may end, but ongoing monitoring and assessment of fingerprint profiles may take place by the information handling system interaction signature platform as is understood in the art.

While the methods described above recite a flow of operation, it is understood that variations are contemplated in the present disclosure including that nothing recited herein requires a particular order of the flow of operation of the intelligent configuration management system. Operation may be performed in any order or simultaneously. For example, FIG. 4 and FIG. 7 recite a flow of activity by an information handling system interaction signature platform and other aspects of an intelligent configuration management system, it is understood that not all steps may be performed in some embodiments. It is also understood that additional steps not recited here may be performed or that steps recited in other portions of the specification may be substituted or otherwise performed in any order.

In accordance with at least one embodiment, the intelligent configuration management system monitors event occurrences and usage measurements for contributing information handling systems associated with a group or enterprise. As an example, intelligent configuration management system agent software located on one or more contributing information handling systems of the enterprise may take measurement of component device utilization data as part of or in connection with the information handling system interaction signature platform. This component device utilization data may include event and usage data for component devices or systems in each monitored contributing information handling system as well as for reports from contributing information handling systems to the monitoring systems data repository. Any portion of the contributing information handling systems associated with an enterprise or group may be monitored in some embodiments. In other embodiments, all contributing information handling systems associated with a group or enterprise may be monitored. Further, any or all of the contributing information handling systems associated with a group or enterprise may also be monitored as client information handling systems for user interaction identification purposes by the information handling system interaction signature platform of the present disclosure. Similar measurement or assessment of a client information handling systems performance characteristics may be made as described above.

In accordance with at least one embodiment, the intelligent configuration management system may initiate a request for component device utilization data from one or more monitored client and contributing information handling systems during user interaction. If a request for data has not been issued, client or contributing information handling systems continue to be monitored by the intelligent configuration management system agents and the hardware implementation monitoring and reporting systems embedded thereon. If a request is issued, component device utilization data is retrieved from one or more client or contributing information handling systems. In other embodiments, it is understood that the intelligent configuration management system agent and hardware implementation monitoring and reporting system may report component device utilization data to a monitoring system data repository at any time from a monitored information handling systems in various embodiments. For example, the intelligent configuration management system agent may report component device utilization data to the intelligent configuration management system including by its own initiation, periodic reporting, reporting triggered by an event or threshold such as detection of new data, or any combination. Thus, in some embodiments, issuance of a request for component device utilization data may not be necessary. Security measures including encryption and security verification may be deployed in the course of communications of reported component device utilization data.

In accordance with at least one embodiment, data from monitored client and contributing information handling systems is stored in a monitoring system data repository as described above. As an example, the intelligent configuration management system code will access current component device utilization data stored in the monitoring system data repository. Accessed data may include component device event and usage data as well as other component device utilization data and may be done in accordance with the present disclosure in several aspects.

In accordance with at least one embodiment, intelligent configuration management system will determine what performance parameters will be used in user interaction signature identification methods described herein. A variety of performance parameters may be analyzed. The performance parameters may determine the bounds or view of performance parameters desired by the IT manager or other users of the intelligent configuration management system. The component device utilization data collected by the intelligent configuration management system and information handling system interaction signature platform is complete enough to provide a high degree of confidence in performance parameter measurements in interaction telemetry data in several embodiments. Furthermore, the completeness of the data gathered by the intelligent configuration management system permits a wide set of optional performance parameters to be applied in some embodiments.

The statistical models of performance parameters in interaction telemetry data and association with user interactions may be determined based on several limitations placed on the data as described above. In various embodiments, a statistical model of data for user interaction performance parameters may be made with respect to particularized times, seasons, locations, class or sub-grouping of information handling system, component devices, or other parsing of the gathered device component utilization data. Similarly, as shown in certain embodiments herein, a statistical model for overall user interaction activity affecting performance across the client information handling system may be conducted as well by the intelligent configuration management system. Depending on the analysis required, it is understood that the intelligent configuration management system may conduct either parametric or non-parametric statistical analysis of the data to yield a demand estimation model with substantial accuracy and confidence levels assigned to usage signature baselines and statistical deviation levels for use in identifying a user's interaction for an indirect identifier. The parametric or non-parametric statistical model of performance may be made by the information handling system interaction signature platform to determine probability distributions for operational performance parameters that serve as indirect identifiers of a user depending on availability and accuracy of statistical parameter assumptions in accordance with several understood statistical analysis techniques.

Various statistical models may be used and applied to the variety of aspects of the component device utilization data described herein. For example, in an embodiment, a non-parametric kernel density estimate model may generate a probability density function to estimate performance parameter interaction telemetry data levels meeting the level of an indirect identifier over a given period of time for the client information handling systems. In another embodiment, the kernel density estimate may be applied to data for specific to types of component devices or systems in the client information handling systems monitored for user interaction telemetry data. Other statistical modeling may be used as is understood. For example in certain embodiments, a parametric statistical model may be used in which a performance parameter in interaction telemetry data has an assumed distribution function selected and the measured performance parameter in user interaction telemetry data is curve fit to the presumed base model. Parametric models, such as normalized or lognormal parametric models, may yield additional accuracy assuming a properly selected base set of assumptions of the assumed performance characteristic telemetry data distribution over a population of client information handling systems or other aspects of monitored user interaction telemetry data as is understood.

While embodiments have been described herein with respect to specific types of client information handling system performance parameter sensors, such as power sensors, duty cycle sensors, thermal stress sensors, system storage condition sensors, mechanical stress sensors, other embodiments may be applied to other types of interfaces.

For example, if it is desirable to provide other or additional types of interfaces, an embodiment using such other or additional types of interfaces may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a monitoring system data repository memory device for storing aggregate information handling system interaction telemetry data representing measured performance parameter levels of hardware component device utilization from component device smart meters and sensors of an operating information handling system and reported for a user of the operating information handling system;
    the monitoring system data repository memory device receiving aggregate information handling system interaction telemetry data for measured performance parameter levels of hardware component device utilization by a plurality of similarly-structured information handling system utilized by other users and commonly managed that is crowd-sourced from a population of the similarly-structured information handling systems accessed by a plurality of the other users;
    an application processor executing instructions of an information handling system interaction signature platform:
        to apply a supervised learning model algorithm to the aggregate information handling system interaction telemetry data for the hardware component device utilization when the user is in control compared to the aggregate information handling system interaction telemetry data for the hardware component device utilization for the plurality of other users to determine with a supervised learning classifier a subset of measured performance parameter levels of the hardware component device utilization as core indirect identifiers of hardware component device utilization specific to the user, where the subset of measured performance parameter levels of the hardware component device utilization as core indirect identifiers of hardware component device utilization specific to the user are classified as distinct via the subset of measured performance parameter levels of the hardware component device utilization as core indirect identifiers that exceed a threshold level of deviation compared to general measured hardware performance parameter levels of the crowd-sourced plurality of other users from similarly-structured information handling systems comprises a learned usage signature of the user by the supervised learning classifier relative to the population of the similarly-structured information handling system, and
        to construct a fingerprint profile of operational activity by the user including a usage signature baseline level of the core indirect identifiers of hardware component operation for the user.

2. The information handling system of claim 1 wherein at least one core indirect identifier of hardware component device utilization includes average CPU consumption.

3. The information handling system of claim 1 wherein at least one core indirect identifier of hardware component device utilization includes an LCD average brightness percentage.

4. The information handling system of claim 1 wherein at least one core indirect identifier of hardware component device utilization includes average threadcount.

5. The information handling system of claim 1 wherein the aggregate information handling system interaction telemetry data reported for the user is received from the information handling system repeatedly accessed by the user with user identification credentials during a learning phase.

6. The information handling system of claim 1 further comprising:
the application processor to analyze the fingerprint profile of operational activity by the user including a plurality of usage signature baseline levels for the plurality of core indirect identifiers to determine if someone other than the user is accessing the information handling system.

7. The information handling system of claim 1 wherein the supervised learning model algorithm is a random forest classification algorithm.

8. A computerized method of constructing a fingerprint profile of operational activity by a user of an information handling system comprising:
storing aggregate information handling system interaction telemetry data representing measured performance parameter levels of hardware component device utilization from component device smart meters and sensors of an operating information handling system and reported for a user of the information handling system in a monitoring system data repository memory device;
receiving aggregate information handling system interaction telemetry data for measured performance parameter levels of hardware component device utilization crowd sourced from similarly-structured information handling systems utilized by by a plurality of other users that is crowd-sourced from a population of similarly-structured information handling systems accessed by the plurality of other users via a network adapter;
executing instructions of an information handling system interaction signature platform via an application processor to apply a supervised learning model algorithm supervised learning classifier to classify measured performance parameter levels of the hardware component device utilization of the operating information handling system by the user that is a distinct classification for the measured performance parameter level that exceeds a threshold level of deviation from the general measured performance parameter levels of hardware component device utilization for the plurality of other users from a crowd-sourced population;
determining a selection of a subset of core indirect identifiers of hardware component device utilization parameters from a plurality of potential indirect identifiers in the interaction telemetry data based on the distinct classification of the measured performance parameter level determined by the supervised learning classifier, wherein the distinct classification of the selection of the subset of core indirect identifier of hardware component operation distinct from similarly-structured information handling systems includes the selection of a subset of measured performance parameter levels that exceed the threshold level of deviation and is used to determine that the interaction is unique enough to identify the specific user to indicate a learned usage signature of selected subset of core indirect identifiers for the user relative to the general measured performance parameter levels of hardware component device utilization for the plurality of other users for similarly-structured information handling systems; and
constructing a fingerprint profile of operational activity by the user including a usage signature baseline level for the measured performance parameter level that is determined to be the selected subset of core indirect identifier for the user.

9. The computerized method of claim 8 wherein the at least one core indirect identifier of hardware component device utilization includes average available memory percentage during operation.

10. The computerized method of claim 8 wherein the at least one core indirect identifier of hardware component device utilization includes CPU idle time percentage.

11. The computerized method of claim 8 wherein the usage signature baseline level for the measured performance parameter level that is determined to be the at least one core indirect identifier is a distribution of values for the at least one core indirect identifier of hardware component device utilization.

12. The computerized method of claim 8 further comprising:
constructing the fingerprint profile of operational activity by determining a learned statistical deviation from the usage signature baseline level for the at least one core indirect identifier of hardware component device utilization.

13. The computerized method of claim 8 further comprising:
the application processor to determine a plurality of core indirect identifiers of a subset of measured performance parameter levels for the user that the supervised learning classifier classifies as distinct from the measured performance parameter levels of hardware component device utilization for the plurality of other users including core indirect identifiers of hardware component operation and core indirect identifiers of software operation.

14. The computerized method of claim 8 wherein the supervised learning model algorithm is a Bayes classification algorithm.

15. An information handling system comprising:
a monitoring system data repository memory device for storing a fingerprint profile of operational activity of hardware component device utilization determined from distinctly classified subset of measured performance parameter levels of hardware component device utilization taken from component device smart meters and sensors of an operating information handling system that are selected as a subset of core indirect identifiers for a user as compared by a supervised learning classifier to general measured performance parameter levels of hardware component device utilization that exceed a threshold level of deviation compared to general measured performance parameter levels of hardware component device utilization for the plurality of other users from a crowd-sourced population of data from similarly-structured information handling systems used by other users of the similarly-structured information handling systems, wherein the selected subset of core indirect identifiers comprise a usage signature baseline level selected as distinct from the general measured performance parameter levels of hardware component device utilization received from crowd sourcing from similarly-structured information handling systems to make an interaction unique enough to identify the user;

an application processor executing instructions of an information handling system interaction signature platform:

to obtain monitored information handling system interaction telemetry data comprising measured performance parameter levels of hardware component device utilization for the subset of core indirect identifiers for the user, and to compare the monitored information handling system interaction telemetry data for the selected subset of core indirect identifiers for the user with the usage signature baseline level to identify the user is accessing the information handling system.

16. The information handling system of claim 15 wherein the fingerprint profile of operational activity by the user includes usage signature baseline levels for a plurality of the subset of measured performance parameter levels of hardware component device utilization identified as core indirect identifiers for the user.

17. The information handling system of claim 15 further comprising:

the application processor executing instructions of the information handling system interaction signature platform to detect a match to the fingerprint profile of operational activity by the user if the monitored information handling system interaction telemetry data for the measured performance parameter level of hardware component device utilization identified as the at least one core indirect identifier of hardware component operation falls within a learned statistical deviation from the usage signature baseline level for the at least one core indirect identifier of the user.

18. The information handling system of claim 15 further comprising:

the application processor assessing user identification credentials to identify a fingerprint profile of operational activity associated with the user identification credentials;

the application processor determining that a non-match has occurred if the monitored information handling system interaction telemetry data for the measured performance parameter level of hardware component device utilization identified as the at least one core indirect identifier of the user falls outside a learned statistical deviation from the user signature baseline level for the at least one core indirect identifier of the user.

19. The information handling system of claim 18 further comprising:

a network adapter for transmitting a dispatch ticket indicating a non-match with the fingerprint profile of operational activity associated with the user identification credentials.

20. The information handling system of claim 15 further comprising:

the application processor to compare the monitored information handling system interaction telemetry data for the measured performance parameter level of hardware component device utilization identified as at least one core indirect identifier with the fingerprint profiles of operational activity for a set of known users.

* * * * *